US008646891B2

(12) United States Patent  (10) Patent No.: US 8,646,891 B2
Hasegawa et al.  (45) Date of Patent: Feb. 11, 2014

(54) INKJET RECORDING INK, INKJET RECORDING INK SET, AND INK CARTRIDGE

(71) Applicants: Shin Hasegawa, Shizuoka (JP); Hiroyuki Fushimi, Shizuoka (JP)

(72) Inventors: Shin Hasegawa, Shizuoka (JP); Hiroyuki Fushimi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/832,630

(22) Filed: Mar. 15, 2013

(65) Prior Publication Data

US 2013/0258007 A1  Oct. 3, 2013

(30) Foreign Application Priority Data

Mar. 28, 2012 (JP) ................................. 2012-075199

(51) Int. Cl.
 *B41J 2/175* (2006.01)
 *G01D 11/00* (2006.01)

(52) U.S. Cl.
 USPC ............................................ 347/86; 347/100

(58) Field of Classification Search
 USPC ............. 347/84–86, 95–100; 106/31.13, 499; 523/160, 161
 See application file for complete search history.

(56) References Cited

U.S. PATENT DOCUMENTS 6,786,959 B2 * 9/2004 Hakiri et al. ................... 106/499
7,101,919 B2 * 9/2006 Hasegawa et al. ............ 523/160

(Continued)

FOREIGN PATENT DOCUMENTS

JP  2006-045436  2/2006
JP  2006-282810  10/2006

(Continued)

*Primary Examiner* — Kristal Feggins
(74) *Attorney, Agent, or Firm* — Oblon, Spivak, McClelland, Maier & Neustadt, L.L.P.

(57) ABSTRACT

An inkjet recording ink, including: a pigment; a water-soluble organic solvent; a surfactant; a polyether-modified silicone oil; a dispersing agent represented by the following General Formula (1) or (2); and water, wherein the water-soluble organic solvent contains: glycerin as a first water-soluble organic solvent; and a second water-soluble organic solvent, wherein the second water-soluble organic solvent is dipropylene glycol, 1,3-butanediol, 3-methyl-1,3-butanediol, 1,5-pentanediol, 1,6-hexanadiol, or any combination thereof, and wherein a mass ratio of the first water-soluble organic solvent: the second water-soluble organic solvent is 1:0.75 to 1:2.25, General Formula (1)

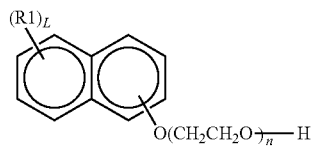

where R1 represents a C1-C20 alkyl group, an allyl group or an aralkyl group, L is an integer of 0 to 7, and n is an integer of 20 to 200, General Formula (2)

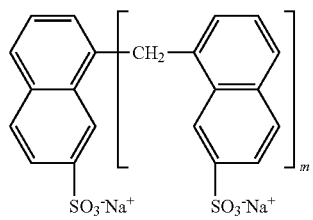

where m is an integer of 1 or greater.

7 Claims, 3 Drawing Sheets

(56) References Cited

U.S. PATENT DOCUMENTS

| | | | |
|---|---|---|---|
| 7,798,629 B2 * | 9/2010 | Hakiri et al. | 347/100 |
| 8,197,049 B2 | 6/2012 | Hakiri et al. | |
| 8,247,473 B2 | 8/2012 | Naruse et al. | |
| 8,491,113 B2 * | 7/2013 | Nishimura | 347/100 |
| 2003/0179268 A1 * | 9/2003 | Koga et al. | 347/100 |
| 2003/0196571 A1 | 10/2003 | Hakiri et al. | |
| 2006/0119680 A1 * | 6/2006 | Kato et al. | 347/100 |
| 2006/0209149 A1 * | 9/2006 | Hasegawa et al. | 347/100 |
| 2006/0272543 A1 * | 12/2006 | Hakiri et al. | 106/499 |
| 2008/0036830 A1 | 2/2008 | Natori et al. | |
| 2009/0263632 A1 | 10/2009 | Kojima et al. | |
| 2010/0010121 A1 | 1/2010 | Koganehira et al. | |
| 2010/0302306 A1 | 12/2010 | Hasegawa et al. | |
| 2010/0309260 A1 | 12/2010 | Hakiri et al. | |
| 2011/0074865 A1 | 3/2011 | Hasegawa et al. | |
| 2011/0267398 A1 | 11/2011 | Hakiri et al. | |
| 2012/0026237 A1 | 2/2012 | Hakiri et al. | |
| 2012/0062646 A1 | 3/2012 | Hasegawa et al. | |
| 2012/0154492 A1 | 6/2012 | Hakiri et al. | |
| 2012/0207984 A1 | 8/2012 | Hasegawa et al. | |
| 2012/0242741 A1 | 9/2012 | Hasegawa et al. | |

FOREIGN PATENT DOCUMENTS

| | | |
|---|---|---|
| JP | 2007-136988 | 6/2007 |
| JP | 2007-146135 | 6/2007 |
| JP | 2009-062519 | 3/2009 |
| JP | 2009-138118 | 6/2009 |
| JP | 2009-235233 | 10/2009 |
| JP | 2010-007054 | 1/2010 |

* cited by examiner

INKJET RECORDING INK, INKJET RECORDING INK SET, AND INK CARTRIDGE

BACKGROUND OF THE INVENTION

1. Field of the Invention

The present invention relates to an inkjet recording ink, an inkjet recording ink set, and an ink cartridge.

2. Description of the Related Art

Inkjet printers employing inkjet recording methods are compact and inexpensive and form color images in a simple manner, and thus have rapidly been becoming popular. In recent years, there has been a requirement for printing high-quality images at high speed. In order to meet this requirement, inks used for inkjet recording methods have to satisfy various characteristics. Especially when high-speed printing is performed, it is important to suppress color bleeding of ink on recording media or maintain jetting stability of ink good. Degradation in jetting stability is mainly caused by dryness or bubbling of the ink in nozzles, and thus it is necessary to improve this phenomenon.

In view of this, as an ink set that does not cause color bleeding on not only plain paper but also coated paper inferior in water absorbability, there has been proposed an ink set containing a black ink and color inks other than the black ink, where the black ink and the color inks use different water-soluble organic solvents, and the water-soluble organic solvent of the color inks is higher in surface tension than the water-soluble organic solvent of the black ink (see, for example, Japanese Patent Application Laid-Open (JP-A) No. 2007-146135).

However, this proposal does not disclose any of combination and ratio of the water-soluble organic solvents that achieve all of less color bleeding, good color saturation and good jetting stability.

Also, there has been proposed an inkjet recording ink excellent in, for example, image clarity, jetting stability and ink storageability, which contains, as a dispersing agent, a compound represented by the following General Formula (1) or a naphthalene sulfonic acid-formalin condensate (see, for example, JP-A Nos. 2006-045436 and 2009-235233).

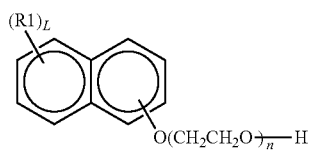

General Formula (1)

In the General Formula (1), R1 represents a C1-C20 alkyl group, an allyl group or an aralkyl group, L is an integer of 0 to 7, and n is an integer of 20 to 200.

Also, there has been proposed an inkjet recording method that does not cause color bleeding on recording medium with less or no ink absorbability (see, for example, JP-A No. 2007-136988).

Also, there has been proposed a formulation of ink containing a water-soluble organic solvent used in the present invention, where an amount of the water-soluble organic solvent is specifically defined (see, for example, JP-A No. 2009-138118).

The water-soluble organic solvent contained in the ink is generally used for improving moisture-retaining property and color saturation of images, and JP-A Nos. 2006-045436 and 2009-235233 use a water-soluble organic solvent used in the present invention. They do not describe which water-soluble organic solvent is effective for moisture-retaining property, or which water-soluble organic solvent is effective for improvement in color saturation of images.

Also, JP-A No. 2007-136988 utilizes UV irradiation and as a result a usable formulation of ink is limited, which makes an inkjet recording device complicated, leading to elevation of cost.

Also, in the ink disclosed in JP-A No. 2009-138118, a black ink and color inks are not satisfactory. When this ink is left to stand for a long period of time, adhesion of the ink to the head's repellent film easily occurs to tend to cause jetting failure.

SUMMARY OF THE INVENTION

The present invention aims to solve the above existing problems and achieve the following object. Specifically, an object of the present invention is to provide an inkjet recording ink exhibiting less color bleeding even on a recording medium with low ink absorbability, and being excellent in jetting stability, ink storageability and deformability.

Means for solving the above problems are as follows.

That is, an inkjet recording ink of the present invention includes:

a pigment;

a water-soluble organic solvent;

a surfactant;

a polyether-modified silicone oil;

a dispersing agent represented by the following General Formula (1) or (2); and water, wherein the water-soluble organic solvent contains: glycerin as a first water-soluble organic solvent; and a second water-soluble organic solvent, wherein the second water-soluble organic solvent is dipropylene glycol, 1,3-butanediol, 3-methyl-1,3-butanediol, 1,5-pentanediol, 1,6-hexanadiol, or any combination thereof, and wherein a mass ratio of the first water-soluble organic solvent: the second water-soluble organic solvent is 1:0.75 to 1:2.25.

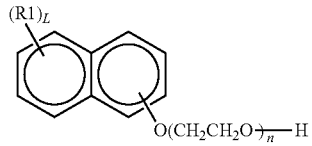

General Formula (1)

In the General Formula (1), R1 represents a C1-C20 alkyl group, an allyl group or an aralkyl group, L is an integer of 0 to 7, and n is an integer of 20 to 200.

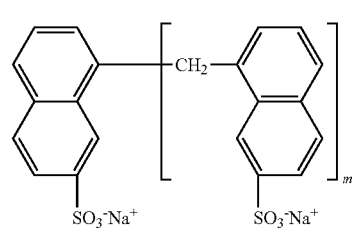

General Formula (2)

In the General Formula (2), m is an integer of 1 or greater.

The present invention can provide an inkjet recording ink exhibiting less color bleeding even on a recording medium with low ink absorbability, and being excellent in jetting stability, ink storageability and deformability. The inkjet recording ink of the present invention can solve the above existing problems.

Figure 1:
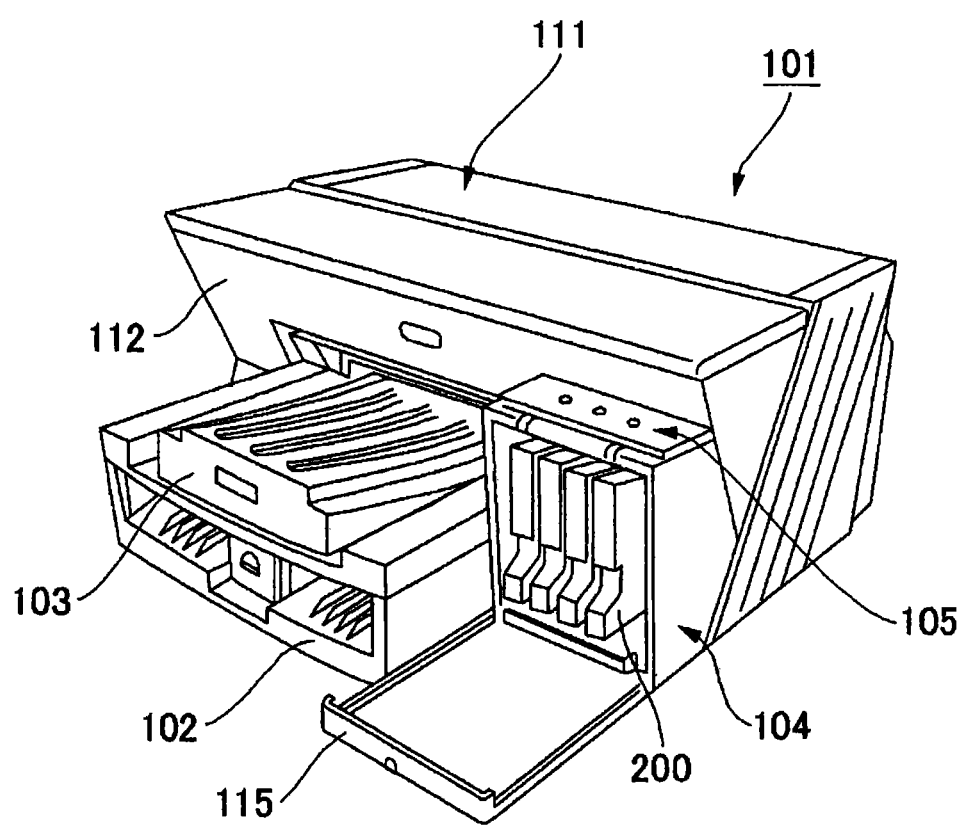
FIG. 1 is a perspective view of one example of an inkjet recording device of the present invention.

DETAILED DESCRIPTION OF THE INVENTION (Inkjet Recording Ink)

An inkjet recording ink (also referred to as "ink," hereinafter) of the present invention contains a pigment, a water-soluble organic solvent, a surfactant, a polyether-modified silicone oil, a dispersing agent and water; and, if necessary, further contains an urethane resin, other ingredients, or both thereof.

<Dispersing Agent>

The dispersing agent is a compound represented by the following General Formula (1) or (2).

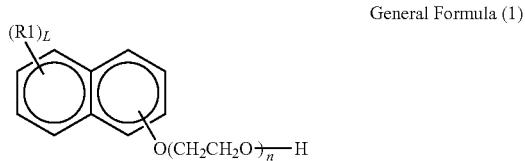

General Formula (1)

In the General Formula (1), R1 represents a C1-C20 alkyl group, an allyl group or an aralkyl group, L is an integer of 0 to 7, and n is an integer of 20 to 200.

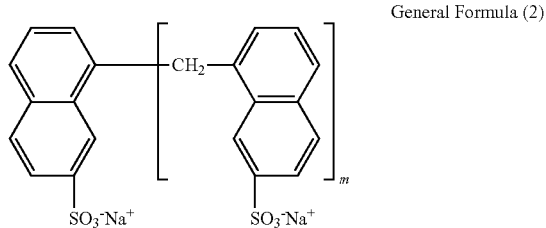

General Formula (2)

In the General Formula (2), m is an integer of 1 or greater.

Especially in color inks, the dispersing agent represented by the General Formula (1) is preferably selected, while in a black ink, the dispersing agent represented by the General Formula (2) is preferably selected. Use of any of these dispersing agents can provide an aqueous pigment dispersion and an aqueous ink containing dispersoids having a small average particle diameter and being excellent in storage stability.

In the General Formula (1), "n" is not particularly limited and may be appropriately selected depending on the intended purpose so long as it is an integer of 20 to 200. It is preferably 20 to 100, more preferably 30 to 50. When "n" is less than 20, the formed dispersion tends to be degraded in dispersion stability. As a result, the formed ink contains pigment particles having a large average particle diameter, so that satisfactory color saturation cannot be obtained in some cases. When "n" is greater than 200, the formed ink is increased in viscosity, potentially making it difficult to perform recording by an inkjet recording method. The dispersing agent represented by the General Formula (1) contains a polyoxyethylene group as a hydrophilic group, being able to favorably maintain charges on the surface of the pigment.

The C1-C20 alkyl group represented by R1 is not particularly limited and may be appropriately selected depending on the intended purpose. Examples thereof include a methyl group, an ethyl group, a propyl group, a butyl group and an isopropyl group.

The aralkyl group represented by R1 is not particularly limited and may be appropriately selected depending on the intended purpose. Examples thereof include a benzyl group, a phenethyl group, a 2-methylbenzyl group, a 3-methylbenzyl group and a 4-methylbenzyl group.

Examples of the dispersing agent represented by the General Formula (1) include polyoxyethylene(n=20)-β-naphthyl ether, polyoxyethylene(n=40)-β-naphthyl ether, and polyoxyethylene(n=60)-β-naphthyl ether. Among them, polyoxyethylene(n=40)-β-naphthyl ether is preferred. Here, "n" means the repeated number of the polyoxyethylene groups; i.e., the above-described "n" in the General Formula (1).

The amount of the dispersing agent represented by the General Formula (1) is preferably 0.1 to 2.0, more preferably 0.1 to 1.0, per 1 of the pigment in the ink, as a mass ratio. When it falls within the above range, the formed ink contains dispersoids having a small volume average particle diameter. When it is less than 0.1, the pigment may be insufficiently dispersed. Whereas when it is more than 2.0, the formed ink is excessively increased in viscosity, potentially making it possible to perform recording by an inkjet recording method.

In the dispersing agent represented by the General Formula (2) (sodium naphthalene sulfonate-formalin condensate), "m" is an integer of 1 or greater denoting the number of repeated units. In general, however, a commercially available product is a mixture of compounds of condensates having different numbers "m" of repeated units.

In the dispersing agent in the present invention, a total amount of a dimer, a timer and a tetramer (m=1 to 3) of naphthalenesulfonic acid is preferably 20% by mass to 80% by mass relative to the total amount of the condensates. When the total amount of the dimer, trimer and tetramer thereof is less than 20% by mass, dispersibility becomes poor, so that the pigment dispersion and the ink obtained are degraded in storage stability, easily causing nozzle clogging. Whereas when it is more than 80% by mass, they are increased in viscosity, potentially making it difficult to perform dispersion.

The amount of the dispersing agent represented by the General Formula (2) is preferably 0.01 to 0.5, more preferably 0.1 to 0.4, per 1 of the pigment in the ink, as a mass ratio. When it is 0.01 to 0.5 per 1 of the pigment in the ink as a mass ratio, the formed ink contains dispersoids having a small volume average particle diameter. When it is less than 0.01, the pigment may be insufficiently dispersed. Whereas when it is more than 0.5, the formed ink is excessively increased in viscosity, potentially making it possible to perform recording by an inkjet recording method.

<Surfactant>

The surfactant is not particularly limited and may be appropriately selected depending on the intended purpose. Examples thereof include nonionic surfactants, anionic surfactants, cationic surfactants and amphoteric surfactants.

Examples of the nonionic surfactants include polyoxyethylene alkyl ethers, polyoxyethylene alkyl phenylyl ether, polyoxyethylene glycol esters, polyoxyethylene-polyoxypropylene decyl ethers, acetylene surfactants, silicone surfactants and fluorosurfactants.

Examples of commercially available products of the nonionic surfactants include BT series (products of Nikko Chemicals Co., Ltd.); NONYPOL series (products of Sanyo Chemical Industries, Co., Ltd.); D-series, and P-series (products of Takemoto Oil & Fat Co., Ltd.); SURFYNOL series (products of Air Products and Chemicals, Inc.); OLFINE series (products of Nissin Chemical Industry Co., Ltd.), EMALEX DAPE series (products of Nihon-Emulsion Co., Ltd.), silicone surfactants (e.g. those manufactured by Dow Corning Toray Co., Ltd.), and fluorosurfactants (e.g. those manufactured by NEOS COMPANY LIMITED, Sumitomo 3M Limited, DuPont, and Daikin Industries, Ltd.).

Examples of the anionic surfactant include aromatic sulfonic acid salts, alkyl sulfonic acid salts, alkylbenzene sulfonic acid salts, alkylnaphthalene sulfonic acid salts, alkane or olefin sulfonic acid salts, alkyl sulfates, polyoxyethylene alkyl or alkylaryl ether sulfuric acid ester salts, alkyldiphenylether disulfonic acid salts, ether carboxylates, alkylsulfosuccinic acid salts, α-sulfoaliphatic acid esters, aliphatic acid salts, condensates between higher fatty acids and amino acids, and naphthenic acid salts. Among them, aromatic sulfonic acid salts are preferred.

Especially for a surfactant for carbon black, an anionic surfactant is preferred, with aromatic sulfonic acid salts being more preferred.

The aromatic sulfonic acid salt is not particularly limited and may be appropriately selected depending on the intended purpose so long as it is a product obtained by introducing sulfonic acid into an aromatic compound and neutralizing it with a basic compound. Examples thereof include products obtained by neutralizing benzenesulfonic acid, p-toluenesulfonic acid, naphthalenesulfonic acid or alkyl naphthalenesulfonic acid with an alkylamine (e.g., butylamine, dibutylamine or triethylamine), an alkanolamine (e.g., monoethanolamine, diethanolamine, triethanolamine or triisopropanolamine), morpholine, aqueous ammonia, sodium hydroxide, lithium hydroxide, potassium hydroxide, aminomethylpropanediol, aminoethylpropanediol, or choline.

Besides, a buffering agent such as trishydroxylmethylaminomethane or Good's buffers may be used as the above basic compound.

Examples of the cationic surfactants include alkylamine salts, aminoalcohol aliphatic acid derivatives, polyamine aliphatic acid derivatives, amine salt-type surfactants (e.g., imidazoline) and quaternary ammonium salt-type surfactants (e.g., alkyltrimethylammonium salts, dialkyldimethylammonium salts, alkyldimethylbenzylammonium salts, pyridinium salts, alkylisoquinolinium salts and benzethonium chloride.

Examples of the amphoteric surfactants include alanine, dodecyldi(aminoethyl)glycine, di(octylaminoethyl)glycine and N-alkyl-N,N-dimethylammoniumbetaine.

<Polyether-Modified Silicone Oil>

The polyether-modified silicone oil preferably has a hydrophobic value, which is calculated by the following equation 1, of 0.40 to 1.5, more preferably 0.40 to 1.2.

$$\text{Hydrophobic value} = A/B \quad \text{Equation 1}$$

In the above equation 1, A and B each denote the following integral value.

A: Integral value of the polyether-modified silicone oil in a range of 0 ppm to 0.3 ppm of its $^1$H-NMR spectrum with tetramethylsilane (TMS) used as a reference substance B: Integral value of the polyether-modified silicone oil in a range of 3.5 ppm to 4.0 ppm of its $^1$H-NMR spectrum with tetramethylsilane (TMS) used as a reference substance Here, the integral value in the range of 3.5 ppm to 4.0 ppm in the $^1$H-NMR spectrum corresponds to the number of hydrogen atoms of a hydrophilic site of the polyether-modified silicone oil such as polyoxyethylene or polyoxylpropylene. The integral value in the range of 0 ppm to 0.3 ppm in the $^1$H-NMR spectrum corresponds to the number of hydrogen atoms of an alkyl group (i.e., a hydrophobic site) bound to Si in the polyether-modified silicone oil.

When the hydrophobic value of the polyether-modified silicone oil is 0.40 or more, the proportion of the hydrophobic sites is increased in the silicone oil. As a result, the silicone oil is easier to adsorb to a water-insoluble resin and makes its surface hydrophilic, being able to prevent the water-insoluble resin from adhering to an ink repellent layer which is a hydrophobic surface. When the hydrophobic value thereof is less than 0.40, the silicone oil does not sufficiently adsorb to the water-insoluble resin, potentially causing adhering of the water-insoluble resin. Whereas when the hydrophobic value of the polyether-modified silicone oil is more than 1.5, the proportion of the hydrophilic sites is reduced relatively in the silicone oil and has a low effect of hydrophilize the surface of a water-insoluble resin, potentially not exhibiting any preventing effects against adhering of the water-insoluble resin.

It should be noted that the above integral value does not contain an integral value of tetramethylsilane (TMS) serving as a reference substance, or an integral value of a peak of a spinning sideband of TMS.

Here, the measurement by $^1$H-NMR is performed using "JEOL JNM-A400FT NMR SYSTEM" (product of JEOL Ltd.) under the conditions: sample concentration: 1% by mass; solvent: deuterated chloroform (CDCl$_3$); cumulated number: 128; and room temperature. When a sample has low solubility, DMSO, DMF-d7, THF-d8, acetone-d6, methanol-d4, deuterated water, or hexane-d14 may be used in this order until sufficient solubility of the sample can be ensured.

The above hydrophobic value is a value rounded off to two decimal places.

Such polyether-modified silicone oil is a compound having dimethylpolysiloxane and, in its side chain, a polyoxyalkylene group which is an addition product of ethylene oxide and propylene oxide, and may be a commercially available product. Examples of the commercially available product include SS-2804 (product of Nippon Unicar Company Limited), DOW CORNING TORAY L-7604 and DOW CORNING TORAY FZ-2123 (products of Dow Corning Toray Co., Ltd.) and KF-353 (product of product of Shin-Etsu Chemical Co., Ltd.).

The amount of the polyether-modified silicone oil in the ink is preferably 0.01% by mass to 3% by mass, more preferably 0.1% by mass to 1% by mass.

<Water-Soluble Organic Solvent>

The water-soluble organic solvent is a combination of: glycerin (first water-soluble organic solvent); and dipropylene glycol, 1,3-butanediol, 3-methyl-1,3-butanediol, 1,5-pentanediol, 1,6-hexanadiol, or any combination thereof (second water-soluble organic solvent). The mass ratio of the first water-soluble organic solvent: the second water-soluble organic solvent is 1:0.75 to 1:2.25.

When the mass ratio of the first water-soluble organic solvent: the second water-soluble organic solvent is 1:0.75 to 1:2.25, nozzle clogging due to drying of ink; i.e., degradation in jetting stability can be prevented, and also the formed image is improved in color saturation, which are advantageous effects.

Specifically, glycerin as the first water-soluble organic solvent can improve the ink in jetting stability. Even after a printer head is left to open for a certain period without capped, nozzle clogging can be prevented. The second water-soluble organic solvent increases the ink in penetrating property and stays the pigment on the surface of a recording media to prevent color bleeding. As a result, it is possible to obtain a printed image having high color saturation.

Furthermore, when the mass ratio of the first water-soluble organic solvent: the second water-soluble organic solvent is the above mass ratio, the ink has high jetting stability and color bleeding can be prevented on a low-water-absorptive coated paper for printing where an inorganic pigment has been coated. When the mass ratio of the second water-soluble organic solvent to the first water-soluble organic solvent is less than 0.75, color bleeding may occur. When it is more than 2.25, nozzle clogging occurs in a nozzle set to be in an open state and then re-operated. In addition, the ink easily forms bubbles and poor defoamability, potentially not exhibiting high jetting stability. Note that, when two or more kinds of the second water-soluble organic solvent are used, the total amount thereof is defined as the amount of the second water-soluble organic solvent.

<Pigment>

The pigment is not particularly limited and may be appropriately selected depending on the intended purpose. Examples thereof include inorganic pigments and organic pigments. One of the above substances may be used independently, or two or more of the above substances may be used in combination.

Examples of the inorganic pigment include titanium oxide, iron oxide, calcium carbonate, barium sulfate, aluminum hydroxide, barium yellow, navy blue, cadmium red, chrome yellow, metal powder, and carbon black. One of the above substances may be used independently, or two or more of the above substances may be used in combination.

Examples of the organic pigment include azo pigment, azomethine pigment, polycyclic pigment, dye chelate, nitro pigment, nitroso pigment, and aniline black. One of the above substances may be used independently, or two or more of the above substances may be used in combination. Among the above substances, the azo pigment and the polycyclic pigment are preferred.

Examples of the azo pigment include azo lake, insoluble azo pigment, condensed azo pigment, and chelate azo pigment.

Examples of the polycyclic pigment include phthalocyanine pigment, perylene pigment, perinone pigment, anthraquinone pigment, quinacridone pigment, dioxazine pigment, indigo pigment, thioindigo pigment, isoindolinone pigment, quinophthalone pigment, and rhodamine B lake pigment.

Examples of the dye chelate include basic dye-type chelate and acid dye-type chelate.

Black pigments are not particularly limited and may be appropriately selected depending on the intended purpose. Examples thereof include carbon blacks (C.I. Pigment Black 7), such as furnace black, lampblack, acetylene black, and channel black; metals, such as copper, iron (C.I. Pigment Black 11), and titanium oxide; organic pigments, such as aniline black (C.I. Pigment Black 1). Among the above substances, carbon black is preferred.

Examples of the carbon black include those produced by known methods, such as a contact method, a furnace method, a thermal method, and a channel method.

The average primary particle diameter of the carbon black is preferably 10.0 nm to 30.0 nm, more preferably 15.0 nm to 20.0 nm. The BET surface area of the carbon black is preferably 100 m$^2$/g to 400 m$^2$/g, more preferably 150 m$^2$/g to 300 m$^2$/g.

The carbon black may be a commercially available product. Examples of the commercially available product include #10B, #20B, #30, #33, #40, #44, #45, #45L, #50, #55, #95, #260, #900, #1000, #2200B, #2300, #2350, #2400B, #2650, #2700, #4000B, CF9, MA8, MA11, MA77, MA100, MA220, MA230, MA600 and MCF88 (these products are of Mitsubishi Chemical Co., Ltd.); MONARCH 120, MONARCH 700, MONARCH 800, MONARCH 880, MONARCH 1000, MONARCH 1100, MONARCH 1300, MONARCH 1400, REGAL L, REGAL 99R, REGAL 250R, REGAL 300R, REGAL 330R, REGAL 400R, REGAL 500R and REGAL 660R (these products are of Cabot Co., Ltd.); PRINTEX A, PRINTEX G, PRINTEX U, PRINTEX V, PRINTEX 55, PRINTEX 140U, PRINTEX 140V, SPECIAL BLACK 4, SPECIAL BLACK 4A, SPECIAL BLACK 5, SPECIAL BLACK 6, SPECIAL BLACK 100, SPECIAL BLACK 250, COLOR BLACK FW1, COLOR BLACK FW2, COLOR BLACK FW2V, COLOR BLACK FW18, COLOR BLACK FW200, COLOR BLACK S150, COLOR BLACK S160 and COLOR BLACK S170 (these products are of Degussa Co., Ltd.).

A pigment for color that can be used in magenta ink is not particularly limited and may be appropriately selected depending on the intended purpose. Examples thereof include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 176, C.I. Pigment Red 184, C.I. Pigment Red 185, C.I. Pigment Red 202, and Pigment Violet 19.

A pigment for color that can be used in cyan ink is not particularly limited and may be appropriately selected depending on the intended purpose. Examples thereof include C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Pigment Blue 63, and C.I. Pigment Blue 66; and C.I. Bat Blue 4 and C.I. Bat Blue 60.

A pigment for color that can be used in yellow ink is not particularly limited and may be appropriately selected depending on the intended purpose. Examples thereof include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 174, and C.I. Pigment Yellow 180.

The amount of the pigment used in the present invention in the ink is not particularly limited and may be appropriately selected depending on the intended purpose, but is preferably 0.1% by mass to 20.0% by mass, more preferably 1% by mass to 10.0% by mass.

<Water>

The water is not particularly limited. The water can be appropriately selected depending on the intended purpose.

Examples thereof include pure water, such as ion-exchanged water, ultrafiltered water, reverse osmosis water, and distilled water; and ultrapure water.

The amount of the water contained is not particularly limited. The amount can be appropriately selected depending on the intended purpose. Relative to the total amount of the ink, the amount of the water contained is preferably 20% by mass to 60% by mass.

<Urethane Resin>

The urethane resin is preferably a water-dispersible urethane resin. Such a water-dispersible urethane resin is generally an aqueous dispersion of a urethane resin obtained by introducing into a backbone of its polyurethane skeleton a hydrophilic component necessary for stably dispersing it in water, or where the urethane resin is dispersed with an external emulsifier. More preferred is a self-dispersed (self-emulsified) urethane resin where a hydrophilic component has been introduced into the backbone thereof.

Examples of the self-dispersed (self-emulsified) urethane resins include water-dispersible various urethane resins (ester-based urethane resins, ether-based urethane resins and carbonate-based urethane resin) which are obtained by reacting a diisocyanate compound and a diol compound with a diol containing an acid group such as a carboxylic acid group or a sulfonic acid group. Among them, anionic self-emulsified ether-based urethane resins are preferred.

Examples of the diisocyanate compound include aliphatic diisocyanates such as hexamethylene diisocyanate and 2,2,4-trimethylhexamethylene diisocyanate; alicyclic diisocyanates such as iophoron diisocyanate, hydrogenated xylylene diisocyanate, 1,4-cyclohexane diisocyanate and 4,4'-dicyclohexylmethane diisocyanate; aromatic-aliphtatic diisocyanates such as xylylene diisocyanate and tetramethylxylylene diisocyanate; aromatic diisocyanates such as toluoylene diisocyanate and phenylmethane diisocyanate; and modified products of these diisocyanates (e.g., carbodiimide-, uretdione- or uretimine-containing modified products).

Examples of the diol compound include: polyetherdiols such as polyethylene glycol, polypropylene glycol, polytetramethylene ether glycol and polyhexamethylene ether glycol; polyesterdiols such as polyethylene adipate, polybutylene adipate, polyneopentyl adipate, poly-3-methylpentyl adipate, polyethylene/butylene adipate and polyneopentyl/hexyl adipate; polylactonediol such as polycprolactonediol; and polycarbonatediols. In terms of storage stability of ink, polyether diols, polyester diols and polycarbonate diols are preferred, polyether diols or polycarbonate diols are more preferred, and polyether diols are further preferred. Polyether diols and polycarbonate diols hardly involve degradation due to hydrolysis in water, so that the formed ink is good in storage stability.

Examples of the above acid group-containing diol include dimethylolacetic acid, dimethylolbutanoic acid, dimethylolpropionic acid and dimethylolbutyric acid. Among them, dimethylolbutanoic acid is preferred.

A method for synthesizing the urethane resin is not particularly limited and may be appropriately selected depending on the intended purpose. Examples thereof include: a solution method including synthesizing a prepolymer having an isocyanate group at an end thereof in a low-boiling-point solvent (e.g., acetone) inert to an isocyanate group, introducing a hydrophilic group into the prepolymer using, for example, a diamine or a polyol, allowing the resultant product to undergo phase inversion by diluting it with water, and evaporating off the solvent to thereby obtain polyurethane dispersion; a prepolymer method including synthesizing a prepolymer having a hydrophilic group introduced thereto and having an isocyanate group at an end thereof, dispersing the prepolymer in water, and extending its chain with an amine; a hot-melt method; a method where water is used as a chain extending agent in an aqueous solution containing a polyurethane prepolymer emulsified therein with an emulsifier; a method including a step of sulfonating an aromatic ring of a polyurethane prepolymer having a free isocyanate group which is obtained from a hydrophobic polyol and an aromatic polyisocyanate; and a method using a block isocyanate.

When the prepolymer method is used, a low-molecular-weight polyhydroxy compound may be used. Examples of the low-molecular-weight polyhydroxy compound include: glycols and alkylene oxide low-mole adducts listed as raw materials of the above polyester diols; trihydric or higher alcohols such as trimethylolethane and trimethylolpropane; and alkylene oxide low-mole adducts thereof.

A generally known method for producing the water-dispersible urethane resin is where a polyurethane prepolymer produced in an organic solvent phase is phase-inversed/emulsified in an aqueous phase, followed by chain extension. A chain extender used here is generally a polyamine such as a diamine. Specifically, the polyurethane prepolymer is extended with water, a diamine or a triamine after or while neutralization of the acid group derived from dimethylolalkanoic acid. The polyamine used as a chain extender for the extension with an amine is generally a diamine or a triamine. Specific examples thereof include hexamethylenediamine, isophorondiamine, hydrazine and piperazine. However, use of a urethane resin produced using a polyamine as a chain extender tends to form a recording liquid having poor storage stability. This is likely because of the following two related disadvantageous effects: the urethane resin extended with an amine (i.e., a urethane resin containing a polyurethaneurea moiety) is easily hydrolyzed; and a polyamine produced from the hydrolysis functions also as an aggregating agent in the pigment-dispersed recording liquid.

The urethane resin may be used in the form of a salt with an alkali metal such as Li, Na or K, or an organic amine salt with, for example, ammonia, dimethylamine, or (mono, di, or tri) ethanolamine. These can be obtained by further neutralizing the urethane resin obtained by the above-described method. A base used for the neutralizaiton may be appropriately selected depending on, for example, the couter ion of a desired salt. Examples thereof include: alkylamines such as butylamine and triethylamine; alkanolamines such as monoethanolamine, diethanolamine and triethanolamine; and inorganic salts such as morpholine, ammonia and sodium hydroxide.

Examples of commercially available resin emulsions include SF460, SF460S, SF420, SF110, SF300 and SF361 (urethane resin emulsions, these products are of DAI-ICHI KOGYO SEIYAKU CO., LTD.) and W-6020, W-5025, W-5661 and W-6010 (urethane resin emulsions, Mitsui Chemicals Polyurethanes Co. Ltd.). The acid value of the anionic self-emulsified ether urethane resin is preferably 40 to 100.

The amount of the urethane resin in the ink is preferably 0.1% by mass to 10% by mass, more preferably 1% by mass to 5% by mass.

<Other Ingredients>

The other ingredients are not particularly limited as long as the effects of the present invention are not impeded. The other ingredients can be appropriately selected depending on the intended purpose. Examples of the other ingredients include a water-dispersible resin, a wetting agent, a penetrating agent, a pH adjuster, a preservative/fungicide, a chelating reagent, a rust preventive agent, a ultraviolet absorber, an antioxidizing agent and a light stabilizer.

—Water-Dispersible Resin—

The water-dispersible resin is not particularly limited as long as the resin is excellent in film formation performance (image formation performance), is high in water repellency, water resistance, and weather resistance, and is high in water resistance and effective in recording images of high image density (high color-producing performance). The water-dispersible resin can be appropriately selected depending on the intended purpose. Examples of the water-dispersible resin include condensation-type synthetic resin, addition-type synthetic resin, and natural polymer compounds.

Examples of the condensation-type synthetic resin include polyester resin, polyurethane resin, polyepoxy resin, polyamide resin, polyether resin, poly (meth) acrylic resin, acryl-silicone resin, and fluorine-based resin, except for urethane resin.

Examples of the addition-type synthetic resin include polyolefin resin, polystyrene-based resin, polyvinyl alcohol-based resin, polyvinyl ester-based resin, polyacrylic acid-based resin, and unsaturated carboxylic acid-based resin.

Examples of the natural polymer compounds include celluloses, rosins, and natural rubber.

—Wetting Agent—

The wetting agent is necessary for improving the ejection stability by adding moistening effects in the inkjet recording ink.

The wetting agent is not particularly limited and may be appropriately selected depending on the intended purpose. Examples thereof include polyhydric alcohols, such as ethylene glycol, diethylene glycol, 1,3-butanediol, 3-methyl-1,3-butyl glycol, triethylene glycol, polyethylene glycol, polypropylene glycol, 1,5-pentanediol, 1,6-hexanediol, glycerin, 1,2,6-hexanetriol, 2-ethyl-1,3-hexanediol, 2,2,4-trimethyl-1,3-pentanediol, 1,2,4-butanetriol, 1,2,3-butanetriol, and petriol; polyhydric alcohol alkyl ethers, such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ethers, such as ethylene glycol monophenyl ether, and ethylene glycol monobenzyl ether; nitrogen-containing heterocyclic compounds, such as 2-pyrrolidone, N-methyl-2-pyrrolidone, N-hydroxyethyl-2-pyrrolidone, 1,3-dimethylimidazolidinone, ε-caprolactam, and γ-butyrolactone; amides, such as formamide, N-methylformamide, and N,N-dimethylformamide; amines, such as monoethanolamine, diethanolamine, and triethylamine, and sulfur-containing compounds, such as dimethyl sulfoxide, sulfolane, and thiodiethanol; and propylene carbonate and ethylene carbonate. One of the above wetting agents may be used independently, or two or more of the above wetting agents may be used in combination. Among the above wetting agents, in terms of being highly effective in preveinting an ejection failure associated with moisture evaporation, the following are preferred: 1,3-butanediol, diethylene glycol, 2,2,4-trimethyl-1,3-pentanediol, triethylene glycol, and glycerin.

The amount of the wetting agent contained is not particularly limited. The amount can be appropriately selected depending on the intended purpose. Relative to the total amount of the ink, the amount of the wetting agent contained is preferably 10% by mass to 50% by mass. If the amount contained is less than 10% by mass, the moisture of the ink is likely to evaporate. In this case, as the moisture of the ink evaporates in an ink supply system of an inkjet recording device, the ink supply system may be clogged with the thickened ink, or any other problem may arise. If the amount contained is greater than 50% by mass, the inkjet recording device is unlikely to be clogged with the thickened ink. However, in order to achieve a desired viscosity of the ink, the amount of solids such as pigment and resin may need to be reduced. In this case, the image density of the recorded matter may decrease.

—Penetrating Agent—

Examples of the penetrating agent include polyol compounds having 8 to 11 carbon atoms, and glycol ether compounds having 8 to 11 carbon atoms.

The penetrating agent is different from the wetting agent. The penetrating agent is relatively smaller in wettability than the wetting agent. Therefore, it can be said that the penetrating agent is a "non-wetting medium." Examples of the non-wetting penetrating agent, the following are preferred: those with a solubility of 0.2% by mass to 5.0% by mass in water at 25° C. Among the substances, the following are more preferred: 2-ethyl-1,3-hexanediol [Solubility: 4.2% by mass (25° C.)], and 2,2,4-trimethyl-1,3-pentanediol [Solubility: 2.0% by mass (25° C.)].

Examples of other polyol compounds include aliphatic diols, such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol.

The other penetrating agents are not particularly limited as long as the penetrating agents can be dissolved in the ink and adjusted to desired physical properties. The penetrating agents may be appropriately selected depending on the intended purpose. Examples thereof include polyhydric alcohol alkyls and aryl ethers, such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether, and lower alcohols, such as ethanol.

The amount of the penetrating agent contained in the inkjet recording ink is preferably 0.1% by mass to 4.0% by mass. If the amount contained is less than 0.1% by mass, the ink may not be able to dry quickly, resulting in a blurred image. If the amount contained is greater than 4.0% by mass, the dispersion stability of the colorant can be lost. In this case, a nozzle is likely to become clogged with the ink, or the ink is likely to penetrate deeper into the recording media (recording medium) than needed, possibly leading to a decrease in the image density or the occurrence of strike-through.

—pH Adjusters—

The pH adjusters are not particularly limited as long as the pH adjusters are able to adjust the pH to 8.5 to 11, preferably 9 to 11, without having adverse effects on the inkjet recording ink. The pH adjusters can be appropriately selected depending on the intended purpose. Examples thereof include alcohol amines, hydroxides of alkali metal elements, hydroxides of ammonium, phosphonium hydroxides, and carbonates of alkali metals. If the pH is less than 8.5 or greater than 11, the amount of an inkjet head dissolved, or of an ink supply unit dissolved, is large, possibly causing alteration or leakage of the ink, an ejection failure, or any other trouble. If the pH is less than 8.5, the pH of the ink may decline when the ink is stored, and the polymer microparticles may be agglutinated due to an increase in the particle diameter.

For example, the pH is measured by pH meter HM-30R (manufactured by DKK-TOA Corporation).

Examples of the alcohol amines include diethanolamine, triethanolamine, and 2-amino-2-ethyl-1,3 propanediol.

Examples of the hydroxides of alkali metal elements include lithium hydroxide, sodium hydroxide, and potassium hydroxide.

Examples of the hydroxides of ammonium include ammonium hydroxide, quaternary ammonium hydroxide, and quaternary phosphonium hydroxide.

Examples of the carbonates of alkali metals include lithium carbonate, sodium carbonate, and potassium carbonate.

—Preservative/Fungicide—

Examples of the preservative/fungicide include sodium dehydroacetate, sodium sorbate, 2-pyridinethiol-1-oxide sodium, sodium benzoate, and pentachlorophenol sodium.

—Chelating Reagent—

Examples of the chelating reagent include sodium ethylenediaminetetraacetate, sodium nitrilotriacetate, hydroxyethyl ethylenediamine triacetic acid sodium, diethylenetriamine pentaacetic acid sodium, and uramil diacetic acid sodium.

—Rust Preventive Agents—

Examples of the rust preventive agents include acid sulfite, sodium thiosulfate, ammonium thiodiglycolate, diisopropyl ammonium nitrite, pentaerythritol tetranitrate, and dicyclohexyl ammonium nitrite.

—Antioxidizing Agents—

Examples of the antioxidizing agents include phenolic antioxidizing agents (including hindered phenolic antioxidizing agents), amine antioxidizing agents, sulfur antioxidizing agents, and phosphorus antioxidizing agents.

—Ultraviolet Absorbers—

Examples of the ultraviolet absorbers include benzophenone-based ultraviolet absorbers, benzotriazole-based ultraviolet absorbers, salicylate-based ultraviolet absorbers, cyanoacrylate-based ultraviolet absorber, and nickel complex salt-based ultraviolet absorbers.

<Method for Producing the Inkjet Recording Ink>

A method for producing the inkjet recording ink is not particularly limited and may be appropriately selected depending on the intended purpose. It is preferably a method where a pigment is pre-mixed with a mixture containing, for example, a nonionic dispersing agent, an anionic surfactant, water, and if necessary a water-soluble organic solvent using a stirring blade, a homogenizer or a beads-less disperser, followed by dispersing using a known disperser such as a sand mill, a ball mill, DYNO MILL, a roll mill, a nanomizer or a homogenizer, and if necessary, the pigment dispersoids and a urethane resin are mixed together. Mixing other materials before mixing of the pigment dispersion and the urethane resin may cause aggregation or thickening.

The method for producing the inkjet recording ink is also preferably a method where the above dispersion is mixed with materials necessary for ink. Here, such ink materials may be added to the dispersion, or the dispersion may be added to such ink materials.

Furthermore, a filter, a centrifugal separator, or other devices may be used to filter off coarse particles from the pigment dispersion and/or ink, to thereby ensure the ink in jetting stability.

(Inkjet Recording Ink Set)

The inkjet recording inks of the present invention may be combined together and used as an inkjet recording ink set ink of the present invention which exhibits less color bleeding even on a recording medium with low ink absorbability.

In particular, the above inkjet recording ink set is preferably a combination of the color ink using the dispersing agent represented by the General Formula (1) and the black ink using the dispersing agent represented by the General Formula (2).

(Ink Cartridge)

An ink cartridge of the present invention contains a container and the inkjet recording ink or the inkjet recording ink set of the present invention housed in the container; and, if necessary, may further contain appropriately selected other members.

The container is not particularly limited, and its shape, structure, size, and material may be appropriately selected. For example, the container is preferably selected from those having at least an ink bag formed of an aluminum laminate film, or a resin film.

Figure 3:
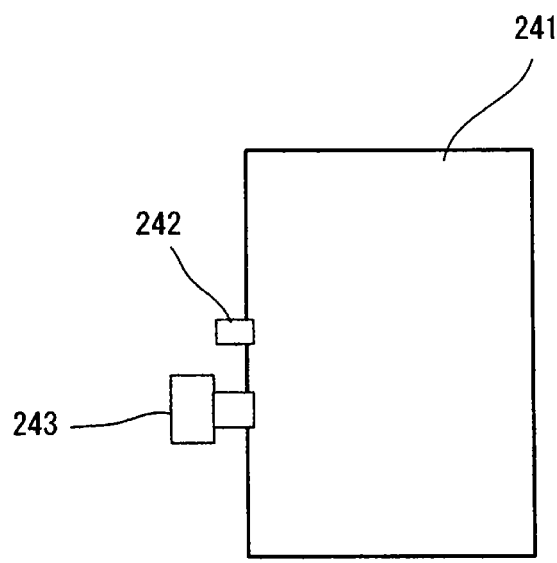
FIG. 3 is a schematic view of one example of an ink bag of an ink cartridge of the present invention.
Figure 4:
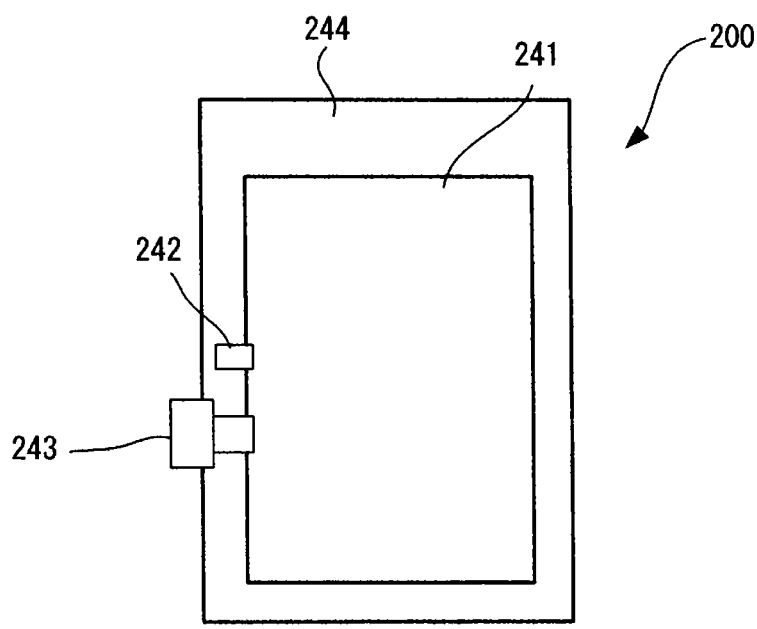
FIG. 4 is a schematic view of a state where the ink bag illustrated in FIG. 3 is housed in a cartridge case.

One embodiment of the ink cartridge of the present invention will be described with reference to FIGS. 3 and 4. FIG. 3 is a schematic view of one example of an ink bag of the ink cartridge of the present invention, and FIG. 4 is a schematic view of a state where the ink bag illustrated in FIG. 3 is housed in a cartridge case (housing case).

As illustrated in FIG. 3, an ink bag 241 is filled with ink by injecting the ink from an ink inlet 242. After removing air present inside the ink bag 241, the ink inlet 242 is sealed by fusing.

At the time of use, a needle equipped with a device main body is inserted into an ink outlet 243 formed of a rubber member to thereby supply the ink to the device main body. The ink bag 241 is formed of a wrapping member such as an air impermeable aluminum laminate film. As illustrated in FIG. 4, the ink bag 241 is typically housed in a plastic cartridge case 244, which is then detachably mounted to various inkjet recording devices and used as an ink cartridge 200.

Particularly preferably, the ink cartridge of the present invention is detachably mounted to an inkjet recording device in use.

(Inkjet Recording Device)

The ink of the present invention (or each ink of an ink set) can suitably used in, for example, various inkjet recording devices such as an inkjet recording printer, a facsimile, a copier, a printer, and a printer-fax-copier complex device. When the ink of the present invention is used in such inkjet recording devices, the ink cartridge of the present invention is preferably mounted thereto.

Next, an inkjet recording device used in Examples will be described.

An inkjet recording device illustrated in FIG. 1 contains a device main body (101), a paper feeding tray (102) for feeding recording sheets to the device main body (101), a paper discharging tray (103) for storing the recording sheets which have been fed to the device main body (101) and on which images have been formed (recorded), and an ink cartridge loading section (104). On the upper plane of the ink cartridge loading section (104), a control unit (105) such as operation keys and a display is provided. The ink cartridge loading section (104) has a front cover (115) that can be open for attaching or detaching the ink cartridge (200). Reference numeral (111) denotes an upper cover and (112) denotes the front surface of a front cover.

Figure 2:
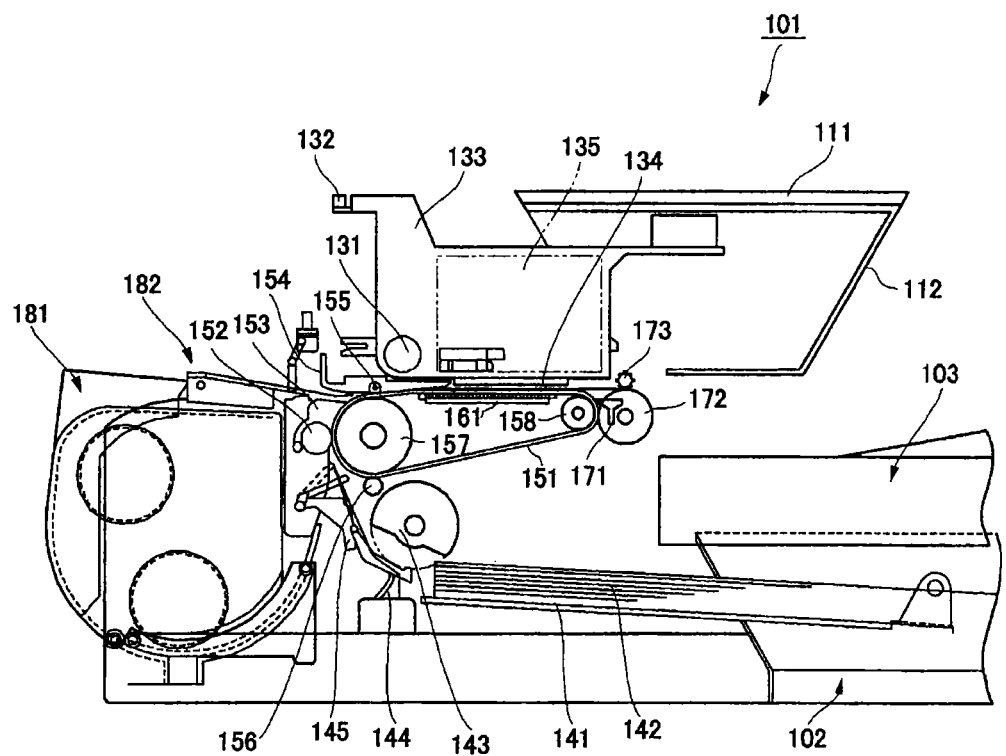
FIG. 2 is an explanatory view of the internal configuration of the inkjet recording device illustrated in FIG. 1.

In the device main body (101), as illustrated in FIG. 2, a carriage (133) is freely slidably held in the main scanning direction by a guide rod (131), which is a guide member laterally passed between left and right side plates, and a stay (132); and the carriage (133) is moved for scanning by a main scanning motor.

A recording head (134) composed of four inkjet recording heads which eject ink droplets of yellow (Y), cyan (C), magenta (M) and black (Bk) is installed in the carriage (133) such that a plurality of ink ejection outlets are aligned in the direction intersecting the main scanning direction and that the ink droplet ejection direction faces downward.

For each of the ink-jet recording heads composing the recording head (134), it is possible to use, for example, a head provided with any of the following energy-generating units for ejecting ink: a piezoelectric actuator such as a piezoelectric element, a thermal actuator that uses a thermoelectric transducer such as a heat element and utilizes phase change caused by film boiling of a liquid, a shape-memory-alloy actuator that utilizes a metal phase change caused by a temperature change, and an electrostatic actuator that utilizes electrostatic force.

Also, the carriage (133) incorporates sub-tanks (135) of each color for supplying the inks of each color to the recording head (134). Each sub-tank (135) is supplied and replenished with the ink of the ink set of the present invention from the ink cartridge (200) of the present invention loaded into the ink cartridge loading section (104), via an ink supply tube.

Meanwhile, as a paper feed unit for feeding sheets of paper (142) loaded on a paper loading section (pressure plate) (141) of the paper feed tray (102), there are provided a half-moon roller [paper feed roller (143)] which feeds the sheets of paper (142) one by one from the paper loading section (141), and a separation pad (144) which faces the paper feed roller (143) and is formed of a material with a large friction coefficient. This separation pad (144) is biased toward the paper feed roller (143) side.

As a conveyance unit for conveying the paper (142, which has been fed from this paper feed unit, under the recording head (134), there are provided a conveyance belt (151) for conveying the paper (142) by means of electrostatic adsorption; a counter roller (152) for conveying the paper (142), which is sent from the paper feed unit via a guide (145), such that the paper (142) is sandwiched between the counter roller (152) and the conveyance belt (151); a conveyance guide (153) for making the paper (142), which is sent upward in the substantially vertical direction, change its direction by approximately 90° and thusly correspond with the conveyance belt (151); and an end pressurizing roller (155) biased toward the conveyance belt (151) side by a pressing member (154). Also, there is provided a charging roller (156) as a charging unit for charging the surface of the conveyance belt (151).

The conveyance belt (151) is an endless belt and is capable of moving in circles in the belt conveyance direction, passed between a conveyance roller (157) and a tension roller (158). The conveyance belt (151) has, for example, a surface layer serving as a paper absorbing surface, that is formed of a resinous material such as an ethylene-tetrafluoroethylene copolymer (ETFE) having a thickness of approximately 40 m for which resistance control has not been conducted, and a back layer (intermediate resistance layer, ground layer) that is formed of the same material as this surface layer, for which resistance control has been conducted using carbon. On the back of the conveyance belt (151), a guide member (161) is placed correspondingly to a region where printing is carried out by the recording head (134). Additionally, as a paper discharge unit for discharging the paper (142) on which images have been recorded by the recording head (134), there are provided a separation pawl (171) for separating the paper (142) from the conveyance belt (151), a paper discharge roller (172) and a paper discharge small roller (173), with the paper discharge tray (103) being placed below the paper discharge roller (172).

A double-sided paper feed unit (181) is mounted on a rear surface portion of the device main body (101) in a freely detachable manner. The double-sided paper feed unit (181) takes in the paper (142) returned by rotation of the conveyance belt (151) in the opposite direction and reverses it, then refeeds it between the counter roller (152) and the conveyance belt (151). Additionally, a manual paper feed unit (182) is provided on an upper surface of the double-sided paper feed unit (181).

In this ink-jet recording device, the sheets of paper (142) are fed one by one from the paper feed unit, and the paper (142) fed upward in the substantially vertical direction is guided by the guide (145) and conveyed between the conveyance belt (151) and the counter roller (152). Further, the conveyance direction of the paper (142) is changed by approximately 90°, as an end of the paper (142) is guided by the conveyance guide (153) and pressed onto the conveyance belt (151) by the end pressurizing roller (155).

On this occasion, the conveyance belt (151) is charged by the charging roller (156), and the paper (142) is electrostatically adsorbed onto the conveyance belt (151) and thusly conveyed. Here, by driving the recording head (134) according to an image signal while moving the carriage (133), ink droplets are ejected onto the paper (142) having stopped so as to carry out recording for one line, and after the paper (142) is conveyed by a predetermined distance, recording for the next line is carried out. On receipt of a recording completion signal or such a signal as indicates that the rear end of the paper (142) has reached the recording region, recording operation is finished, and the paper (142) is discharged onto the paper discharge tray (103).

Once the amount of recording ink remaining in the sub-tanks (135) has been detected as too small, a required amount of ink is supplied from the ink cartridge (200) into the sub-tanks (135).

As to this inkjet recording device, when ink in the ink cartridge (200) has been used up, it is possible to replace only the ink bag inside the ink cartridge (200) by dismantling the housing of the ink cartridge (200). Also, even when the ink cartridge (200) is longitudinally placed and employs a front-loading structure, it is possible to supply ink stably. Therefore, even when the device main body (101) is installed with little space over it, for example when the device main body (101) is stored in a rack or when an object is placed over the device main body (101), it is possible to replace the ink cartridge (200) with ease.

Note that, here, the example where a serial (shuttle) type inkjet recording device in which the carriage scans is explained above, but the present invention can be also applied for a line inkjet recording device equipped with a line-type head.

(Image Recorded Matter)

An image recorded matter of the present invention is an image recorded matter whose image is recorded with the inkjet recording ink of the present invention or the inkjet recording ink set of the present invention. In other words, the image recorded matter of the present invention contains: an image; and a recording medium, wherein the image is recorded on the recording medium with the inkjet recording ink of the present invention or the inkjet recording ink set of the present invention.

The ink of the present invention can suitably used for both recording media (e.g., paper) that have absorbability with respect to ink and recording media that are substantially non-absorbable with respect to ink.

Specific examples of the recording media include: plastic sheets made of a base material such as polyethylene terephthalate, polycarbonate, polypropylene, polyethylene, polyfulfone, ABS resin or polyvinyl chloride; recording media containing a metal surface of brass, iron, aluminum, SUS or copper; recording media obtained by coating a metal to a non-metallic base material with a method such as vapor deposition; recording media containing paper as a base material which has been subjected to, for example, a water-repellent treatment; and recording media made of so-called ceramic materials which are obtained by firing inorganic materials at high temperatures.

Among them, paper is most preferred for economical reasons and natural texture.

EXAMPLES

The present invention will next be described in more detail by way of Examples and Comparative Examples. However, the present invention should not be construed as being limited to these Examples. In the Examples, the unit "parts(s)" is "part(s) by mass."

Types of pigments, dispersing agents and urethane resins Examples and Comparative Examples are presented in Tables 1 to 3.

TABLE 1

| Type of pigment | C.I. (product name, manufacturer) |
|---|---|
| Pigment α | Pigment Black 7 (NIPEX 150, Degussa Co.) |
| Pigment β | Pigment Yellow 74 (Yellow No. 43, Dainichiseika Color & Chemicals Mfg. Co., Ltd.) |
| Pigment γ | Pigment Red 122 (CROMOPHTAL JET Magenta DMQ, Chiba Specialty Chemicals) |
| Pigment δ | Pigment Blue 15:3 (cyanine blue A-385, Dainichiseika Color & Chemicals Mfg. Co., Ltd.) |

TABLE 2

| Type of dispersing agent | Type |
|---|---|
| I | Compound of General Formula (1) where n = 10, product of TAKEMOTO OIL & FAT CO., LTD. |
| II | Compound of General Formula (1) where n = 210, product of TAKEMOTO OIL & FAT CO., LTD. |
| III | Compound of General Formula (1) where n = 20, product of TAKEMOTO OIL & FAT CO., LTD. |
| IV | Compound of General Formula (1) where n = 200, product of TAKEMOTO OIL & FAT CO., LTD. |
| V | Compound of General Formula (1) where n = 40, product of TAKEMOTO OIL & FAT CO., LTD. |
| VI | Compound of General Formula (2) in which dimers to tetramers are contained in an amount of 18% by mass, product of TAKEMOTO OIL & FAT CO., LTD. |
| VII | Compound of General Formula (2) in which a total amount of dimer, trimer and tetramer is 82% by mass, product of TAKEMOTO OIL & FAT CO., LTD. |
| VIII | Compound of General Formula (2) in which a total amount of dimer, trimer and tetramer is 20% by mass, product of TAKEMOTO OIL & FAT CO., LTD. |
| IX | Compound of General Formula (2) in which a total amount of dimer, trimer and tetramer is 80% by mass, product of TAKEMOTO OIL & FAT CO., LTD. |
| X | Compound of General Formula (2) in which a total amount of dimer, trimer and tetramer is 50% by mass, product of TAKEMOTO OIL & FAT CO., LTD. |
| XI | HITENOL 18E, product of DAI-ICHI KOGYO SEIYAKU CO., LTD. |

TABLE 3

| Type of urethane resin | Type (product name, manufacturer) | Ionic structure |
|---|---|---|
| Resin a | Urethane resin (XW-75-W920, Mitsui Chemicals Polyurethanes Co. Ltd.) | Anionic self-emulsified ether |
| Resin b | Urethane resin (SF460S, DAI-ICHI KOGYO SEIYAKU CO., LTD.) | Anionic self-emulsified carbonate |

[Preparation of Pigment Dispersions]

The following materials for pigment dispersions were pre-mixed together in accordance with the following formulations to thereby obtain mixed slurries. Next, using a disc-type media mill (UAM model, product of KOTOBUKI INDUSTRIES CO., LTD.) containing 0.015 mm-zirconia beads (filling rate: 70%), each of the slurries was subjected to circulation dispersing at a circumferential speed of 6 m/s and a liquid temperature of 10° C. until the volume average particle diameter of the dispersed particles was around 100 nm. Then, coarse particles were separated from the obtained product using a centrifugal separator (product of KUBOTA Co., Ltd.: Model-7700), followed by filtrating with a filter having a pore diameter of 1.2 μm, to thereby obtain a pigment dispersion of each color. Note that, the following ratios are ratios of the pigment to the dispersing agent on the mass basis.
<Basic Formulation of Black Pigment Dispersion>
Black pigment (Pigment α): 250 parts
Dispersing agent X: 50 parts (ratio: 0.200)
Distilled water: 700 parts
<Basic Formulation of Yellow Pigment Dispersion>
Yellow pigment (Pigment β): 200 parts
Dispersing agent V: 75 parts (ratio: 0.375)
Distilled water: 725 parts
<Basic Formulation of Magenta Pigment Dispersion>
Magenta pigment (Pigment γ): 200 parts
Dispersing agent V: 75 parts (ratio: 0.375)
Distilled water: 725 parts
<Basic Formulation of Cyan Pigment Dispersion>
Cyan pigment (Pigment δ): 200 parts
Dispersing agent V: 75 parts (ratio: 0.375)
Distilled water: 725 parts Preparation of Inks of Examples and Comparative Examples The following materials for inks were stirred for 30 min in accordance with the following formulations. Each of the resultant mixtures was filtrated with a membrane filter having a pore diameter of 0.8 μm, followed by degassing in vacuum, to thereby obtain inks of Examples and Comparative Examples.
<Basic Formulation of Black Ink>
Black pigment (20.0 parts as its pigment dispersion): 5.0 parts
First water-soluble organic solvent (glycerin): 7.5 parts
Second water-soluble organic solvent 1 (1,3-butanediol): 7.5 parts
Second water-soluble organic solvent 2 (3-methyl-1,3-butanediol): 7.5 parts
(first water-soluble organic solvent: second water-soluble organic solvents=1:2)
2-Ethyl-1,3-hexanadiol: 3.0 parts
2-Pyrrolidone: 3.0 parts
Sodium polyoxyethylene(3)alkyl(C13) acetate: 0.5 parts
Polyether-modified silicone oil W (KF-353, product of Shin-Etsu Chemical Co., Ltd.): 0.02 parts Urethane resin a: 2.0 parts
Distilled water: 63.98 parts
<Basic Formulation of Yellow Ink>
Yellow pigment (20.0 parts as its pigment dispersion): 5.0 parts
First water-soluble organic solvent (glycerin): 7.5 parts
Second water-soluble organic solvent 1 (1,3-butanediol): 7.5 parts
Second water-soluble organic solvent 2 (1,5-pentanediol): 7.5 parts
(first water-soluble organic solvent: second water-soluble organic solvents=1:2)
2-Ethyl-1,3-hexanadiol: 3.0 parts
2-Pyrrolidone: 3.0 parts
Sodium polyoxyethylene(3)alkyl(C13) acetate: 0.5 parts
Polyether-modified silicone oil W (KF-353, product of Shin-Etsu Chemical Co., Ltd.): 0.02 parts
Urethane resin a: 2.0 parts
Distilled water: 63.98 parts
<Basic Formulation of Magenta Ink>
Magenta pigment (20.0 parts as its pigment dispersion): 5.0 parts
First water-soluble organic solvent (glycerin): 7.5 parts
Second water-soluble organic solvent 1 (1,3-butanediol): 7.5 parts
Second water-soluble organic solvent 2 (dipropylene glycol): 7.5 parts
(first water-soluble organic solvent: second water-soluble organic solvents=1:2)
2-Ethyl-1,3-hexanadiol: 3.0 parts
2-Pyrrolidone: 3.0 parts
Sodium polyoxyethylene(3)alkyl(C13) acetate: 0.5 parts
Polyether-modified silicone oil W (KF-353, product of Shin-Etsu Chemical Co., Ltd.): 0.02 parts
Urethane resin a: 2.0 parts
Distilled water: 63.98 parts
<Basic Formulation of Cyan Ink>
Cyan pigment (20.0 parts as its pigment dispersion): 5.0 parts
First water-soluble organic solvent (glycerin): 7.5 parts
Second water-soluble organic solvent 1 (1,3-butanediol): 7.5 parts
Second water-soluble organic solvent 2 (1,6-hexanadiol): 7.5 parts (first water-soluble organic solvent: second water-soluble organic solvents=1:2)
2-Ethyl-1,3-hexanadiol: 3.0 parts
2-Pyrrolidone: 3.0 parts
Sodium polyoxyethylene(3)alkyl(C13) acetate: 0.5 parts
Polyether-modified silicone oil W (KF-353, product of Shin-Etsu Chemical Co., Ltd.): 0.02 parts
Urethane resin a: 2.0 parts
Distilled water: 63.98 parts Example 1

Black Ink No. 1

Black ink No. 1 was obtained in accordance with <Basic formulation of black pigment dispersion> in the [Preparation of pigment dispersions] and <Basic formulation of black ink> in the [Preparation of inks of Examples and Comparative Examples].

Example 2

Yellow Ink No. 2

Yellow ink No. 2 was obtained in accordance with <Basic formulation of yellow pigment dispersion> in the [Preparation of pigment dispersions] and <Basic formulation of yellow ink> in the [Preparation of inks of Examples and Comparative Examples].

Example 3

Magenta Ink No. 3

Magenta ink No. 3 was obtained in accordance with <Basic formulation of magenta pigment dispersion> in the [Preparation of pigment dispersions] and <Basic formulation of magenta ink> in the [Preparation of inks of Examples and Comparative Examples].

Example 4

Cyan Ink No. 4

Cyan ink No. 4 was obtained in accordance with <Basic formulation of cyan pigment dispersion> in the [Preparation of pigment dispersions] and <Basic formulation of cyan ink> in the [Preparation of inks of Examples and Comparative Examples].

Example 5

Yellow Ink No. 5

Yellow ink No. 5 was obtained in the same manner as in Example 2 except that the dispersing agent V was changed to dispersing agent III.

Example 6

Magenta Ink No. 6

Magenta ink No. 6 was obtained in the same manner as in Example 3 except that the dispersing agent V was changed to dispersing agent IV.

Comparative Example 1

Cyan Ink No. 7

Cyan ink No. 7 was obtained in the same manner as in Example 4 except that the dispersing agent V was changed to dispersing agent I.

Comparative Example 2

Yellow Ink No. 8

Cyan ink No. 8 was obtained in the same manner as in Example 2 except that the dispersing agent V was changed to dispersing agent II.

Example 7

Yellow Ink No. 9

Yellow ink No. 9 was obtained in the same manner as in Example 2 except that the amount of the dispersing agent was changed from 75 parts to 20 parts (ratio: 0.1).

Example 8

Magenta Ink No. 10

Magenta ink No. 10 was obtained in the same manner as in Example 3 except that the amount of the dispersing agent was changed from 75 parts to 400 parts (ratio: 2.0).

Example 9

Cyan Ink No. 11

Cyan ink No. 11 was obtained in the same manner as in Example 4 except that the amount of the dispersing agent was changed from 75 parts to 18 parts (ratio: 0.09).

Example 10

Yellow Ink No. 12

Yellow ink No. 12 was obtained in the same manner as in Example 2 except that the amount of the dispersing agent was changed from 75 parts to 402 parts (ratio: 2.01).

Example 11

Black Ink No. 13

Black ink No. 13 was obtained in the same manner as in Example 1 except that the amount of the dispersing agent was changed from 50 parts to 2.5 parts (ratio: 0.01).

Example 12

Black Ink No. 14

Black ink No. 14 was obtained in the same manner as in Example 1 except that the amount of the dispersing agent was changed from 50 parts to 125 parts (ratio: 0.5).

Example 13

Black Ink No. 15

Black ink No. 15 was obtained in the same manner as in Example 1 except that the amount of the dispersing agent was changed from 50 parts to 2.0 parts (ratio: 0.008).

Example 14

Black Ink No. 16

Black ink No. 16 was obtained in the same manner as in Example 1 except that the amount of the dispersing agent was changed from 50 parts to 130 parts (ratio: 0.52).

Example 15

Black Ink No. 17

Black ink No. 17 was obtained in the same manner as in Example 1 except that the dispersing agent X was changed to dispersing agent VIII.

Example 16

Black Ink No. 18

Black ink No. 18 was obtained in the same manner as in Example 1 except that the dispersing agent X was changed to dispersing agent IX.

Example 17

Black Ink No. 19

Black ink No. 19 was obtained in the same manner as in Example 1 except that the dispersing agent X was changed to dispersing agent VI.

Example 18

Black Ink No. 20

Black ink No. 20 was obtained in the same manner as in Example 1 except that the dispersing agent X was changed to dispersing agent VII.

Example 19

Yellow Ink No. 21

Yellow ink No. 21 was obtained in the same manner as in Example 2 except that the urethane resin a was not added.

Example 20

Magenta Ink No. 22

Magenta ink No. 22 was obtained in the same manner as in Example 3 except that the urethane resin a was changed to urethane resin b.

Comparative Example 3

Black Ink No. 23

Black ink No. 23 was obtained in the same manner as in Example 1 except that the polyether-modified silicone oil was changed to SILICONE OIL Z (product of Ricoh Company, Ltd.) (hydrophobic value: infinite).

Comparative Example 4

Yellow Ink No. 24

Yellow ink No. 24 was obtained in the same manner as in Example 2 except that the polyether-modified silicone oil was changed to SILICONE OIL Z (product of Ricoh Company, Ltd.) (hydrophobic value: infinite).

Comparative Example 5

Magenta Ink No. 25

Magenta ink No. 25 was obtained in the same manner as in Example 3 except that the polyether-modified silicone oil was changed to SILICONE OIL Z (product of Ricoh Company, Ltd.) (hydrophobic value: infinite).

Comparative Example 6

Cyan Ink No. 26

Cyan ink No. 26 was obtained in the same manner as in Example 4 except that the polyether-modified silicone oil was changed to SILICONE OIL Z (product of Ricoh Company, Ltd.) (hydrophobic value: infinite).

Comparative Example 7

Black Ink No. 27

Black ink No. 27 was obtained in the same manner as in Example 1 except that the dispersing agent X was changed to dispersing agent XI.

Comparative Example 8

Yellow Ink No. 28

Yellow ink No. 28 was obtained in the same manner as in Example 2 except that the dispersing agent X was changed to dispersing agent XI.

Comparative Example 9

Magenta Ink No. 29

Magenta ink No. 29 was obtained in the same manner as in Example 3 except that the dispersing agent V was changed to dispersing agent XI.

Comparative Example 10

Cyan Ink No. 30

Cyan ink No. 30 was obtained in the same manner as in Example 4 except that the dispersing agent V was changed to dispersing agent XI.

Example 21

Black Ink No. 31

Black ink No. 31 was obtained in the same manner as in Example 1 except that the amount of the second water-soluble organic solvent 1 (1,3-butanediol) was changed from 7.5 parts to 3.0 parts and that the amount of the second water-soluble organic solvent 2 (3-methyl-1,3-butanediol) was changed from 7.5 parts to 3.0 parts (i.e., the ratio of the total amount of the second water-soluble organic solvents to the amount of the first water-soluble organic solvent: 0.80).

Example 22

Yellow Ink No. 32

Yellow ink No. 32 was obtained in the same manner as in Example 2 except that the amount of the second water-soluble organic solvent 1 (1,3-butanediol) was changed from 7.5 parts to 8.0 parts and that the amount of the second water-soluble organic solvent 2 (1,5-pentanediol) was changed from 7.5 parts to 8.0 parts (i.e., the ratio of the total amount of the second water-soluble organic solvents to the amount of the first water-soluble organic solvent: 2.13).

Comparative Example 11

Magenta Ink No. 33

Magenta ink No. 33 was obtained in the same manner as in Example 3 except that the amount of the second water-soluble organic solvent 1 (1,3-butanediol) was changed from 7.5 parts to 2.5 parts and that the amount of the second water-soluble organic solvent 2 (dipropylene glycol) was changed from 7.5 parts to 2.5 parts (i.e., the ratio of the total amount of the second water-soluble organic solvents to the amount of the first water-soluble organic solvent: 0.67).

Comparative Example 12

Cyan Ink No. 34

Cyan ink No. 34 was obtained in the same manner as in Example 4 except that the amount of the second water-soluble organic solvent 1 (1,3-butanediol) was changed from 7.5 parts to 8.5 parts and that the amount of the second water-soluble organic solvent 2 (1,6-hexanadiol) was changed from 7.5 parts to 8.5 parts (i.e., the ratio of the total amount of the second water-soluble organic solvents to the amount of the first water-soluble organic solvent: 2.27).

Comparative Example 13

Black Ink No. 35

Black ink No. 35 was obtained in the same manner as in Example 1 except that the first water-soluble organic solvent was changed from glycerin to diethylene glycol and that the polyether-modified silicone oil was changed to SILICONE OIL Z (product of Ricoh Company, Ltd.) (hydrophobic value: infinite).

Comparative Example 14

Yellow Ink No. 36

Yellow ink No. 36 was obtained in the same manner as in Example 2 except that the second water-soluble organic solvent 1 was changed from 1,3-butanediol to diethylene glycol, that the second water-soluble organic solvent 2 was not added, and that the polyether-modified silicone oil was changed to SILICONE OIL Z (product of Ricoh Company, Ltd.) (hydrophobic value: infinite).

Example 23

Black Ink No. 37

Black ink No. 37 was obtained in the same manner as in Example 1 except that the polyether-modified silicone oil W was changed to DOW CORNING TORAY FZ-2123 (product of Dow Corning Toray Co., Ltd.).

Example 24

Yellow Ink No. 38

Yellow ink No. 38 was obtained in the same manner as in Example 2 except that the polyether-modified silicone oil W was changed to DOW CORNING TORAY FZ-2123 (product of Dow Corning Toray Co., Ltd.).

Example 25

Magenta Ink No. 39

Magenta ink No. 39 was obtained in the same manner as in Example 3 except that the polyether-modified silicone oil W was changed to DOW CORNING TORAY FZ-2123 (product of Dow Corning Toray Co., Ltd.).

Example 26

Cyan Ink No. 40

Cyan ink No. 40 was obtained in the same manner as in Example 4 except that the polyether-modified silicone oil W was changed to DOW CORNING TORAY FZ-2123 (product of Dow Corning Toray Co., Ltd.).

Tables 4-1 and 4-2 collectively present details of the above Examples and Comparative Examples. Note that, abbreviations in Tables 4-1 and 4-2 have the following meanings.

Gly: glycerin
DEG: diethylene glycol
DPG: dipropylene glycol
1.3-BD: 1,3-butanediol
3-Me-1.3-BD: 3-methyl-1,3-butanediol
1.5-PD: 1,5-pentanediol
1.6-HD: 1,6-hexanediol

TABLE 4-1

| Ex. | Ink | Dispersion Pigment | Dispersing agent | Ratio of dispersing agent | First water-soluble organic solvent | Second water-soluble organic solvent 1 | Second water-soluble organic solvent 2 | First:Second | Silicone oil | Urethane resin |
|---|---|---|---|---|---|---|---|---|---|---|
| Ex. 1  | No. 1  | α (black)    | X    | 0.200 | Gly | 1.3-BD | 3-Me-1.3-BD | 1:2.0  | W | a |
| Ex. 2  | No. 2  | β (yellow)   | V    | 0.375 | Gly | 1.3-BD | 1.5-PD      | 1:2.0  | W | a |
| Ex. 3  | No. 3  | γ (magenta)  | V    | 0.375 | Gly | 1.3-BD | DPG         | 1:2.0  | W | a |
| Ex. 4  | No. 4  | δ (cyan)     | V    | 0.375 | Gly | 1.3-BD | 1.6-HD      | 1:2.0  | W | a |
| Ex. 5  | No. 5  | β (yellow)   | III  | 0.375 | Gly | 1.3-BD | 1.5-PD      | 1:2.0  | W | a |
| Ex. 6  | No. 6  | γ (magenta)  | IV   | 0.375 | Gly | 1.3-BD | DPG         | 1:2.0  | W | a |
| Ex. 7  | No. 9  | β (yellow)   | V    | 0.100 | Gly | 1.3-BD | 1.5-PD      | 1:2.0  | W | a |
| Ex. 8  | No. 10 | γ (magenta)  | V    | 2.000 | Gly | 1.3-BD | DPG         | 1:2.0  | W | a |
| Ex. 9  | No. 11 | δ (cyan)     | V    | 0.090 | Gly | 1.3-BD | 1.6-HD      | 1:2.0  | W | a |
| Ex. 10 | No. 12 | β (yellow)   | V    | 2.010 | Gly | 1.3-BD | 1.5-PD      | 1:2.0  | W | a |
| Ex. 11 | No. 13 | α (black)    | X    | 0.010 | Gly | 1.3-BD | 3-Me-1.3-BD | 1:2.0  | W | a |
| Ex. 12 | No. 14 | α (black)    | X    | 0.500 | Gly | 1.3-BD | 3-Me-1.3-BD | 1:2.0  | W | a |
| Ex. 13 | No. 15 | α (black)    | X    | 0.008 | Gly | 1.3-BD | 3-Me-1.3-BD | 1:2.0  | W | a |
| Ex. 14 | No. 16 | α (black)    | X    | 0.520 | Gly | 1.3-BD | 3-Me-1.3-BD | 1:2.0  | W | a |
| Ex. 15 | No. 17 | α (black)    | VIII | 0.200 | Gly | 1.3-BD | 3-Me-1.3-BD | 1:2.0  | W | a |
| Ex. 16 | No. 18 | α (black)    | IX   | 0.200 | Gly | 1.3-BD | 3-Me-1.3-BD | 1:2.0  | W | a |
| Ex. 17 | No. 19 | α (black)    | VI   | 0.200 | Gly | 1.3-BD | 3-Me-1.3-BD | 1:2.0  | W | a |
| Ex. 18 | No. 20 | α (black)    | VII  | 0.200 | Gly | 1.3-BD | 3-Me-1.3-BD | 1:2.0  | W | a |
| Ex. 19 | No. 21 | β (yellow)   | V    | 0.375 | Gly | 1.3-BD | 1.5-PD      | 1:2.0  | W | not added |
| Ex. 20 | No. 22 | γ (magenta)  | V    | 0.375 | Gly | 1.3-BD | DPG         | 1:0.8  | W | b |
| Ex. 21 | No. 31 | α (black)    | X    | 0.200 | Gly | 1.3-BD | 3-Me-1.3-BD | 1:2.13 | W | a |
| Ex. 22 | No. 32 | β (yellow)   | V    | 0.375 | Gly | 1.3-BD | 1.5-PD      | 1:2.0  | W | a |
| Ex. 23 | No. 37 | α (black)    | X    | 0.200 | Gly | 1.3-BD | 3-Me-1.3-BD | 1:2.0  | FZ-2123 | a |
| Ex. 24 | No. 38 | β (yellow)   | V    | 0.375 | Gly | 1.3-BD | 1.5-PD      | 1:2.0  | FZ-2123 | a |
| Ex. 25 | No. 39 | γ (magenta)  | V    | 0.375 | Gly | 1.3-BD | DPG         | 1:2.0  | FZ-2123 | a |
| Ex. 26 | No. 40 | δ (cyan)     | V    | 0.375 | Gly | 1.3-BD | 1.6-HD      | 1:2.0  | FZ-2123 | a |

TABLE 4-2

| Comp. Ex. | Ink | Dispersion Pigment | Dispersing agent | Ratio of dispersing agent | First water-soluble organic solvent | Second water-soluble organic solvent 1 | Second water-soluble organic solvent 2 | First:Second | Silicone oil | Urethane resin |
|---|---|---|---|---|---|---|---|---|---|---|
| Comp. Ex. 1  | No. 7  | δ (cyan)    | I   | 0.375 | Gly | 1.3-BD | 1.6-HD      | 1:2.0 | W | a |
| Comp. Ex. 2  | No. 8  | β (yellow)  | II  | 0.375 | Gly | 1.3-BD | 1.5-PD      | 1:2.0 | W | a |
| Comp. Ex. 3  | No. 23 | α (black)   | X   | 0.200 | Gly | 1.3-BD | 3-Me-1.3-BD | 1:2.0 | Z | a |
| Comp. Ex. 4  | No. 24 | β (yellow)  | V   | 0.375 | Gly | 1.3-BD | 1.5-PD      | 1:2.0 | Z | a |
| Comp. Ex. 5  | No. 25 | γ (magenta) | V   | 0.375 | Gly | 1.3-BD | DPG         | 1:2.0 | Z | a |
| Comp. Ex. 6  | No. 26 | δ (cyan)    | V   | 0.375 | Gly | 1.3-BD | 1.6-HD      | 1:2.0 | Z | a |
| Comp. Ex. 7  | No. 27 | α (black)   | XI  | 0.200 | Gly | 1.3-BD | 3-Me-1.3-BD | 1:2.0 | W | a |
| Comp. Ex. 8  | No. 28 | β (yellow)  | XI  | 0.375 | Gly | 1.3-BD | 1.5-PD      | 1:2.0 | W | a |
| Comp. Ex. 9  | No. 29 | γ (magenta) | XI  | 0.375 | Gly | 1.3-BD | DPG         | 1:2.0 | W | a |
| Comp. Ex. 10 | No. 30 | δ (cyan)    | XI  | 0.375 | Gly | 1.3-BD | 1.6-HD      | 1:2.0 | W | a |

TABLE 4-2-continued

|  |  | Dispersion | | | Ink | | | | | |
|---|---|---|---|---|---|---|---|---|---|---|
|  |  |  |  |  | First water-soluble organic solvent | Second water-soluble organic solvent 1 | Second water-soluble organic solvent 2 |  |  |  |
| Comp. Ex. | Ink | Pigment | Dispersing agent | Ratio of dispersing agent | | | | First:Second | Silicone oil | Urethane resin |
| Comp. Ex. 11 | No. 33 | γ (magenta) | V | 0.375 | Gly | 1.3-BD | DPG | 1:0.67 | W | a |
| Comp. Ex. 12 | No. 34 | δ (cyan) | V | 0.375 | Gly | 1.3-BD | 1.6-HD | 1:2.27 | W | a |
| Comp. Ex. 13 | No. 35 | α (black) | X | 0.200 | DEG | 1.3-BD | 3-Me-1.3-BD | 1:2.0 | Z | a |
| Comp. Ex. 14 | No. 36 | β (yellow) | V | 0.375 | Gly | DEG | — | 1:1.0 | Z | a |

Each of the inks Nos. 1 to 40 was charged into an ink pack for inkjet printer IPSIO GX 5000 (product of Ricoh Company, Ltd.) to thereby prepare an ink cartridge. This ink cartridge was mounted to the above inkjet printer and was caused to print images on PPC paper XEROX4200 (product of Xerox Corporation). The printed image was measured using X-RITE938 (product of X-Rite Co.). In addition, its jetting stability, ink storageability, and bubble formation were evaluated by the following test methods. The evaluation results are presented in Table 5.

Evaluation 1: Evaluation of Image (Color Saturation and Solid Density of Image)

The color saturation of the color solid image and the density of the black solid image were evaluated according to the following criteria.

Here, vividness (color saturation) of the image refers to a distance from the original point to color measurements plotted on a chromaticity diagram where the color measurements were those of the solid image of an image sample obtained using X-RITE938 (product of X-Rite Co.). Specifically, the vividness (color saturation) of the image is value a and value b on a chromaticity diagram.

—Color Saturation of Yellow Ink—
[Evaluation Criteria]
A: 80≤Color saturation
B: 75≤Color saturation<80
C: Color saturation<75
—Color Saturation of Magenta Ink—
[Evaluation Criteria]
A: 70≤Color saturation
B: 65≤Color saturation<70
C: Color saturation<65
—Color Saturation of Cyan Ink—
[Evaluation Criteria]
A: 55≤Color saturation
B: 50≤Color saturation<55
C: Color saturation<50
—Density of Black Solid Image—
[Evaluation Criteria]
A: 1.30≤Density
B: 1.20≤Density<1.30
C: Density<1.20

Evaluation 2: Jetting Stability

The above inkjet printer was placed in a constant temperature-humidity bath an inner atmosphere of which was set at 32° C. in temperature and 30% RH in humidity, and a printing pattern chart described below was continuously printed on 20 paper sheets, followed by resting for 20 min without printing. This operation was performed 50 times to print 1,000 paper sheets in total. Thereafter, a nozzle check pattern was printed out, and the jetting stability was judged based on the number of non-image portions in the pattern according to the following criteria.

—Printing Pattern Chart—

A printing pattern chart is a chart having a printing area of 5% in each color relative to the total area of a paper sheet. This printing pattern was printed at 100% duty for each ink. The printing conditions were such that the recording density was 300 dpi (118 dots per cm), and the printing mode was one pass printing.

[Evaluation Criteria]
A: Any non-image portions were not observed.
B: Ten or less non-image portions were observed.
C: More than ten non-image portions were observed.

Evaluation 3: Storage Stability of Ink

Each of the inks was placed in a polyethylene container, and the container was sealed. After storing of the ink at 70° C. for 3 weeks, particle diameters, surface tension, and viscosity of the ink were measured, and the rate of change from the initial physical properties was evaluated according to the following criteria.

The particle diameter was measured at 25° C. using a particle size distribution analyzer (MICROTRACK UPA, product of NIKKISO CO., LTD.).

The viscosity was measured at 25° C. using a viscometer (RL-550, product of TOKI SANGYO CO., LTD.).

The surface tension was measured at 25° C. using a full-automated surface tensiometer (CBVP-Z, product of Kyowa Interface Science Co., LTD.).

A: 10% or less
B: 30% or less but more than 10%
C: More than 30%

Evaluation 4: Evaluation of Bubble Formation

Each (10 mL) of the inks was placed in a predetermined cylinder (L480, diameter: 65 mm, scale: 0 mL to 1,000 mL, scale interval: 10 mL) and heated to a predetermined temperature (25° C.). Next, an air inlet tube was set such that its tip came into contact with the bottom surface of the cylinder, and air was fed therethrough (flow rate: 94 mL/min×5 min). The cylinder was left to stand for 10 min after air feeding had been stopped, and the height of bubbles was evaluated according to the following criteria.

[Evaluation Criteria]

TABLE 5

| Ex. or Comp. Ex. | Evaluation of image | Jetting stability | Storage stability of ink | Evaluation bubble formation |
|---|---|---|---|---|
| Ex. 1 | A | A | A | A |
| Ex. 2 | A | A | A | A |
| Ex. 3 | A | A | A | A |

TABLE 5-continued

| Ex. or Comp. Ex. | Evaluation of image | Jetting stability | Storage stability of ink | Evaluation bubble formation |
|---|---|---|---|---|
| Ex. 4 | A | A | A | A |
| Ex. 5 | A | A | B | A |
| Ex. 6 | A | B | A | A |
| Ex. 7 | A | A | A | A |
| Ex. 8 | A | A | A | A |
| Ex. 9 | A | A | B | A |
| Ex. 10 | A | B | A | A |
| Ex. 11 | A | A | A | A |
| Ex. 12 | A | A | A | A |
| Ex. 13 | A | A | B | A |
| Ex. 14 | A | B | A | A |
| Ex. 15 | A | A | A | A |
| Ex. 16 | A | A | A | A |
| Ex. 17 | A | A | B | A |
| Ex. 18 | A | B | A | A |
| Ex. 19 | A | A | B | A |
| Ex. 20 | A | B | B | A |
| Ex. 21 | A | A | A | A |
| Ex. 22 | A | A | A | A |
| Ex. 23 | A | A | A | A |
| Ex. 24 | A | A | A | A |
| Ex. 25 | A | A | A | A |
| Ex. 26 | A | A | A | A |
| Comp. Ex. 1 | A | C | A | B |
| Comp. Ex. 2 | A | C | A | B |
| Comp. Ex. 3 | A | C | A | B |
| Comp. Ex. 4 | A | C | A | B |
| Comp. Ex. 5 | B | C | B | C |
| Comp. Ex. 6 | C | C | B | C |
| Comp. Ex. 7 | B | B | C | C |
| Comp. Ex. 8 | B | B | C | C |
| Comp. Ex. 9 | A | B | C | C |
| Comp. Ex. 10 | A | B | C | C |
| Comp. Ex. 11 | B | A | A | B |
| Comp. Ex. 12 | B | C | B | A |
| Comp. Ex. 13 | B | C | B | B |
| Comp. Ex. 14 | B | C | B | B |

A: Height ≤ 50 mL
B: 50 mL < Height ≤ 100 mL
C: 100 mL < Height

Examples 27 to 46 and Comparative Examples 15 to 24

The ink Nos. 1 to 40 were combined as presented in Table 6 to prepare ink sets of Examples 27 to 46 and Comparative Examples 15 to 24. Each of the ink sets was charged into an ink pack for inkjet printer IPSIO GX 5000 (product of Ricoh Company, Ltd.) to thereby prepare an ink cartridge. This ink cartridge was mounted to the above inkjet printer and was caused to print images on PPC paper XEROX4200 (product of Xerox Corporation). The printed image was evaluated for color bleeding in the following manner. The results are presented in Table 6.

Evaluation 5: Evaluation of Color Bleeding

A black letter was printed on a background of each color, and an extent of color bleeding was visually observed and evaluated according to the following criteria.
[Evaluation Criteria]

TABLE 6

| Ex. or Comp. Ex. | Bk | Y | M | C | Color bleeding |
|---|---|---|---|---|---|
| Ex. 27 | No. 1 | No. 2 | No. 3 | No. 4 | A |
| Ex. 28 | No. 1 | No. 5 | No. 3 | No. 4 | A |
| Ex. 29 | No. 1 | No. 2 | No. 6 | No. 4 | A |
| Ex. 30 | No. 1 | No. 9 | No. 3 | No. 4 | A |
| Ex. 31 | No. 1 | No. 2 | No. 10 | No. 4 | A |
| Ex. 32 | No. 1 | No. 2 | No. 3 | No. 11 | A |
| Ex. 33 | No. 1 | No. 12 | No. 3 | No. 4 | A |
| Ex. 34 | No. 13 | No. 2 | No. 3 | No. 4 | A |
| Ex. 35 | No. 14 | No. 2 | No. 3 | No. 4 | A |
| Ex. 36 | No. 15 | No. 2 | No. 3 | No. 4 | A |
| Ex. 37 | No. 16 | No. 2 | No. 3 | No. 4 | A |
| Ex. 38 | No. 17 | No. 2 | No. 3 | No. 4 | A |
| Ex. 39 | No. 18 | No. 2 | No. 3 | No. 4 | A |
| Ex. 40 | No. 19 | No. 2 | No. 3 | No. 4 | A |
| Ex. 41 | No. 20 | No. 2 | No. 3 | No. 4 | A |
| Ex. 42 | No. 1 | No. 21 | No. 3 | No. 4 | A |
| Ex. 43 | No. 1 | No. 32 | No. 3 | No. 4 | A |
| Ex. 44 | No. 31 | No. 2 | No. 3 | No. 4 | A |
| Ex. 45 | No. 31 | No. 2 | No. 3 | No. 4 | A |
| Ex. 46 | No. 37 | No. 38 | No. 39 | No. 40 | A |
| Comp. Ex. 15 | No. 1 | No. 2 | No. 7 | No. 4 | B |
| Comp. Ex. 16 | No. 1 | No. 2 | No. 3 | No. 8 | B |
| Comp. Ex. 17 | No. 23 | No. 2 | No. 3 | No. 4 | B |
| Comp. Ex. 18 | No. 1 | No. 24 | No. 3 | No. 4 | B |
| Comp. Ex. 19 | No. 1 | No. 2 | No. 25 | No. 4 | B |
| Comp. Ex. 20 | No. 1 | No. 2 | No. 3 | No. 26 | B |
| Comp. Ex. 21 | No. 1 | No. 2 | No. 33 | No. 4 | C |
| Comp. Ex. 22 | No. 1 | No. 2 | No. 3 | No. 34 | C |
| Comp. Ex. 23 | No. 35 | No. 2 | No. 3 | No. 4 | C |
| Comp. Ex. 24 | No. 1 | No. 36 | No. 3 | No. 4 | C |

A: No bleeding occurred in any of yellow, magenta and cyan; i.e., clear printed image.
B: Slight bleeding occurred in yellow, magenta or cyan.
C: Bleeding occurred in yellow, magenta or cyan to such an extent that the profile of the letter became vague.

As is clear from Tables 5 and 6, the inks of Examples are superior to those of Comparative Examples.

The following are reasons why the inks of Comparative Examples could not exhibit good results. In the inks of Comparative Examples 1 and 2, the "n" in the dispersing agent represented by the General Formula (1) does not fall within the defined range. In the inks of Comparative Examples 3 to 6, the polyether-modified silicone oil was not used. In the inks of Comparative Examples 7 to 10, a dispersing agent different from that represented by General Formula (1) or (2) was used. In the inks of Comparative Examples 11 and 12, the mass ratio of the first water-soluble organic solvent: the second water-soluble organic solvent does not fall within the defined range. In the inks of Comparative Examples 13 and 14, the material defined as the first water-soluble organic solvent or the second water-soluble organic solvent was not used.

The ink sets of Comparative Examples 15 to 24 could not exhibit good results about color bleeding, since they contain each of the inks of Comparative Examples 1 to 14.

The inks of Examples 7 and 8 each contain the dispersing agent represented by the General Formula (1) so as to satisfy the ratio defined in the following aspect <2> of the present invention, and thus are superior to those of Examples 9 and 10 in terms of ink storageability or jetting stability.

The inks of Examples 2 and 3 each contain the dispersing agent represented by General Formula (1) where n=40 as defined in the following aspect <3> of the present invention, and thus are superior to those of Examples 5 and 6 where n=20 or 200 in terms of ink storageability or jetting stability.

The inks of Examples 11, 12, 15 and 16 each contain the dispersing agent represented by the General Formula (2) that satisfies the numerical limitation defined in the following aspect <4> of the present invention, and thus are superior to those of Examples 13, 14, 17 and 18 each containing the dispersing agent that does not satisfy that numerical range in terms of ink storageability or jetting stability.

Comparing the inks of Examples 2 and 3 with those of Examples 19 and 20, the inks of Examples 2 and 3 each contain an anionic self-emulsfied ether urethane resin defined in the following <5> of the present invention, and thus are superior to the ink of Example 19 free of the urethane resin or to the ink of Example 20 containing an anionic self-emulsified carbonate urethane resin in terms of ink storageability or jetting stability.

Aspects of the present invention are, for example, as follows.

<1> An inkjet recording ink, including:
a pigment;
a water-soluble organic solvent;
a surfactant;
a polyether-modified silicone oil;
a dispersing agent represented by the following General Formula (1) or (2); and
water,
wherein the water-soluble organic solvent contains: glycerin as a first water-soluble organic solvent; and a second water-soluble organic solvent,
wherein the second water-soluble organic solvent is dipropylene glycol, 1,3-butanediol, 3-methyl-1,3-butanediol, 1,5-pentanediol, 1,6-hexanadiol, or any combination thereof, and
wherein a mass ratio of the first water-soluble organic solvent: the second water-soluble organic solvent is 1:0.75 to 1:2.25,

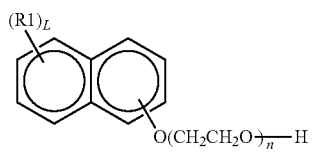

General Formula (1)

where R1 represents a C1-C20 alkyl group, an allyl group or an aralkyl group, L is an integer of 0 to 7, and n is an integer of 20 to 200,

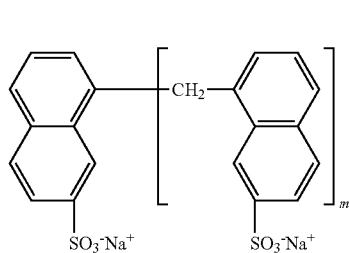

General Formula (2)

where m is an integer of 1 or greater.

<2> The inkjet recording ink according to <1>,
wherein a mass ratio of the pigment: the dispersing agent is 1:0.1 to 1:2.0.

<3> The inkjet recording ink according to <1> or <2>,
wherein the dispersing agent represented by the General Formula (1) is polyoxyethylene(n=40)-β-naphthyl ether.

<4> The inkjet recording ink according to any one of <1> to <3>,
wherein a total amount of a dimer, a trimer and a tetramer of naphthalenesulfonic acid in the dispersing agent represented by the General Formula (2) is 20% by mass to 80% by mass, and
wherein a mass ratio of the pigment: the dispersing agent represented by the General Formula (2) is 1:0.01 to 1:0.5.

<5> The inkjet recording ink according to any one of <1> to <4>, further including: an anionic self-emulsified ether urethane resin.

<6> An inkjet recording ink set, including:
a color ink; and
a black ink,
wherein the color ink is the inkjet recording ink according to any one of <1> to <5> and containing the dispersing agent represented by the General Formula (1); and
wherein the black ink is the inkjet recording ink according to any one of <1> to <5> and containing the dispersing agent represented by the General Formula (2).

<7> An ink cartridge, including:
the inkjet recording ink according to any one of <1> to <5> or the inkjet recording ink set according to <6>; and
a container, which houses the inkjet recording ink or the inkjet recording ink set.

<8> An inkjet recording device, including:
the ink cartridge according to <7>.

<9> An image recorded matter, including:
an image; and
a recording medium,
wherein the image is recorded on the recording medium with the inkjet recording ink according to any one of <1> to <5> or the inkjet recording ink set according to <6>.

This application claims priority to Japanese application No. 2012-075199, filed on Mar. 28, 2012 and incorporated herein by reference.

What is claimed is:
1. An inkjet recording ink, comprising:
a pigment;
a water-soluble organic solvent;
a surfactant;
a polyether-modified silicone oil;
a dispersing agent represented by the following General Formula (1) or (2); and
water,
wherein the water-soluble organic solvent comprises: glycerin as a first water-soluble organic solvent; and a second water-soluble organic solvent,
wherein the second water-soluble organic solvent is dipropylene glycol, 1,3-butanediol, 3-methyl-1,3-butanediol, 1,5-pentanediol, 1,6-hexanadiol, or any combination thereof, and
wherein a mass ratio of the first water-soluble organic solvent:the second water-soluble organic solvent is 1:0.75 to 1:2.25,

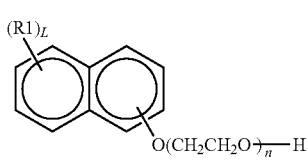

General Formula (1)

where R1 represents a C1-C20 alkyl group, an allyl group or an aralkyl group, L is an integer of 0 to 7, and n is an integer of 20 to 200,

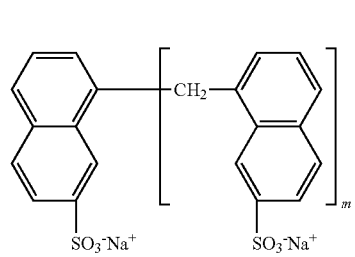

General Formula (2)

where m is an integer of 1 or greater.

2. The inkjet recording ink according to claim 1, wherein a mass ratio of the pigment: the dispersing agent is 1:0.1 to 1:2.0.

3. The inkjet recording ink according to claim 1, wherein the dispersing agent represented by the General Formula (1) is polyoxyethylene(n=40)-β-naphthyl ether.

4. The inkjet recording ink according to claim 1, wherein a total amount of a dimer, a trimer and a tetramer of naphthalenesulfonic acid in the dispersing agent represented by the General Formula (2) is 20% by mass to 80% by mass, and wherein a mass ratio of the pigment:the dispersing agent represented by the General Formula (2) is 1:0.01 to 1:0.5.

5. The inkjet recording ink according to claim 1, further comprising: an anionic self-emulsified ether urethane resin.

6. An inkjet recording ink set, comprising:
a color ink; and
a black ink,
wherein the color ink comprises: a pigment; a water-soluble organic solvent; a surfactant; a polyether-modified silicone oil; a dispersing agent represented by the following General Formula (1); and water,
wherein the black ink comprises: a pigment; a water-soluble organic solvent; a surfactant; a polyether-modified silicone oil; a dispersing agent represented by the following General Formula (2); and water,
wherein the water-soluble organic solvent comprises: glycerin as a first water-soluble organic solvent; and a second water-soluble organic solvent,
wherein the second water-soluble organic solvent in each of the color ink and the black ink is dipropylene glycol, 1,3-butanediol, 3-methyl-1,3-butanediol, 1,5-pentanediol, 1,6-hexanadiol, or any combination thereof, and
wherein a mass ratio of the first water-soluble organic solvent:the second water-soluble organic solvent is 1:0.75 to 1:2.25,

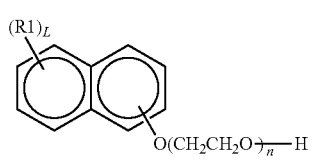

General Formula (1)

where R1 represents a C1-C20 alkyl group, an allyl group or an aralkyl group, L is an integer of 0 to 7, and n is an integer of 20 to 200,

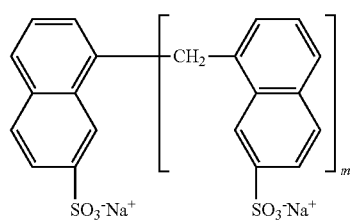

General Formula (2)

where m is an integer of 1 or greater.

7. An ink cartridge, comprising:
an inkjet recording ink or an inkjet recording ink set; and
a container, which houses the inkjet recording ink or the inkjet recording ink set,
wherein the inkjet recording ink comprises: a pigment; a water-soluble organic solvent; a surfactant; a polyether-modified silicone oil; a dispersing agent represented by the following General Formula (1) or (2); and water,
wherein the inkjet recording ink set comprises: a color ink; and a black ink,
wherein the color ink comprises: a pigment; a water-soluble organic solvent; a surfactant; a polyether-modified silicone oil; a dispersing agent represented by the following General Formula (1); and water,
wherein the black ink comprises: a pigment; a water-soluble organic solvent; a surfactant; a polyether-modified silicone oil; a dispersing agent represented by the following General Formula (2); and water,
wherein the water-soluble organic solvent in each of the inkjet recording ink, the color ink and the black ink comprises: glycerin as a first water-soluble organic solvent; and a second water-soluble organic solvent,
wherein the second water-soluble organic solvent is dipropylene glycol, 1,3-butanediol, 3-methyl-1,3-butanediol, 1,5-pentanediol, 1,6-hexanadiol, or any combination thereof, and
wherein a mass ratio of the first water-soluble organic solvent:the second water-soluble organic solvent is 1:0.75 to 1:2.25,

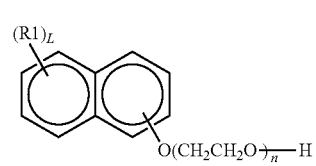

General Formula (1)

where R1 represents a C1-C20 alkyl group, an allyl group or an aralkyl group, L is an integer of 0 to 7, and n is an integer of 20 to 200,

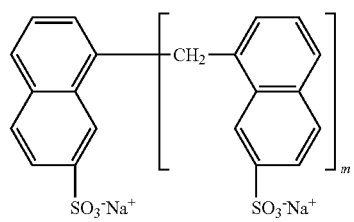

General Formula (2)

where m is an integer of 1 or greater.

\* \* \* \* \*